United States Patent [19]

Drexl

[11] Patent Number: 5,732,809
[45] Date of Patent: Mar. 31, 1998

[54] MOTOR VEHICLE TRANSMISSION HAVING A FRICTION CLUTCH

[75] Inventor: Hans Jürgen Drexl, Schonungen, Germany

[73] Assignee: Fichtel & Sachs AG, Schweinfurt, Germany

[21] Appl. No.: 631,339

[22] Filed: Apr. 12, 1996

[51] Int. Cl.$^6$ ............................................. F16D 13/71
[52] U.S. Cl. ................................ 192/70.14; 192/107 R
[58] Field of Search ............................. 192/70.14, 107 C, 192/107 R, 200, 207

[56] References Cited

U.S. PATENT DOCUMENTS

| | | |
|---|---|---|
| 4,727,972 | 3/1988 | Mueller . |
| 5,048,659 | 9/1991 | Tojima . |
| 5,085,307 | 2/1992 | Scheer . |
| 5,184,704 | 2/1993 | Hays ........................ 192/70.14 |
| 5,240,458 | 8/1993 | Linglain et al. . |
| 5,305,864 | 4/1994 | Strohm . |
| 5,431,269 | 7/1995 | Ament et al. . |
| 5,553,695 | 9/1996 | Lutz et al. ................. 192/70.14 |

FOREIGN PATENT DOCUMENTS

| | | |
|---|---|---|
| 0511630 | 11/1992 | European Pat. Off. . |
| 0552387 | 7/1993 | European Pat. Off. . |
| 0554472 | 8/1993 | European Pat. Off. . |
| 0794147 | 2/1936 | France . |
| 0625868 | 2/1936 | Germany . |
| 4114100 | 11/1992 | Germany . |
| 4334374 | 4/1995 | Germany . |

OTHER PUBLICATIONS

"Handbuch der Kraftfahrzeugtechnik", (extract from the Handbook of Motor Vehicle Technology), Buschmann and Koessler, pp. 514–521, 1973.

*Primary Examiner*—Rodney H. Bonck
*Attorney, Agent, or Firm*—Nils H. Ljungman and Associates

[57] ABSTRACT

A friction clutch can have a relatively thin application plate with a diameter ratio $D_A$ (outside diameter) to $D_I$ (inside diameter) of less than about 1.4. As a result of such a configuration, the application plate, in spite of the reduction in the size of the friction surface, exhibits an improved ability to transmit the torque in the event of the sudden application of a high frictional load. In accordance with at least one embodiment this same diameter ratio can be given to the corresponding friction linings as well.

23 Claims, 6 Drawing Sheets

MOTOR VEHICLE TRANSMISSION HAVING A FRICTION CLUTCH

BACKGROUND OF THE INVENTION

1. Field of the Invention

This invention generally relates to a drive system of a motor vehicle wherein a motor is provided for driving at least one of the wheels. The motor is connected to the drive wheel or wheels by means of a transmission arrangement which connects the output of the motor to the drive shaft of the wheel or wheels. Conventionally, the drive train of a motor vehicle provides the propelling action for the drive wheels of the motor vehicle. The vehicle has front and rear wheelsets, each comprising a right and left side wheel. The conventional drive train comprises a drive apparatus for delivering torque to at least a front wheel and a rear wheel on one side of the vehicle. The drive train comprises all the parts that generate power and transmit the power to the driving wheels. Such parts include the engine, the transmission, the driveline, the differential assembly, and the driving axles. The engine and transmission are mounted on the frame and the driving wheels are free to move up and down in the angularity of the line of drive.

Such a drive train can also generally include a friction clutch having a clutch disc with an application plate.

Namely, a friction clutch, in particular for motor vehicles, including a driven counter-application plate in the form of a flywheel, a clutch housing which is firmly attached to the counter-application plate, and an application plate which is mounted on the clutch housing non-rotationally but so that it can move axially, which application plate can be pressurized by a clutch spring toward the counter-application plate for the frictional clamping of a clutch disc with friction linings between the application plate and the counter-application plate.

This invention also generally relates to a friction clutch for a transmission of a motor vehicle, wherein the friction clutch has a clutch disc with corresponding friction linings. In addition, the present invention also relates to a clutch disc for a friction clutch, and a method for manufacturing and using such a friction clutch in a motor vehicle.

In general, a friction clutch can have a hub installed in a non-rotational manner on a transmission shaft, which transmission shaft defines an axis of rotation. The clutch will also generally have a hub disc, with or without a torsional vibration damper, and, extending from the hub disc, there can be a lining support for supporting at least one friction lining, or ring, and preferably two friction rings disposed at some axial distance from one another. The at least one friction ring can generally be oriented concentrically to the axis of rotation and is fastened to the support. Further, the friction rings will have a contact surface disposed towards the lining supports, a friction surface disposed away from the lining supports, an inner radial contour defining an inside diameter, and an outer radial contour defining an outside diameter.

2. Background Information

On known friction clutches, it has been determined that in the event of the sudden and extreme application of heavy loads—e.g. multiple starts in quick succession on a hill—the torque transmission capability of the clutch is severely reduced, at least temporarily. In addition to the known reduction of the coefficient of friction which is caused by the increased temperature, one essential reason for this loss of torque transmission capability is the fact that the application plate can experience a conical deformation as a result of a strong temperature gradient between its friction surface and its reverse side, whereby the application plate moves away from the friction linings in the vicinity of its outside diameter. This deformation is usually reversible, as long as the deformation occurs in the elastic range. This deformation is essentially completely reversed when the temperature equalizes or when cooling takes place.

Various measures have been employed to solve this problem in similar devices. For example, on one hand it would be possible to create a greater heat absorption capacity by using thicker plates or a larger clutch, but that would naturally also result in a greater mass moment of inertia or a larger space requirement. Similar devices have also employed controlled air cooling, but when the loads are applied to the clutch suddenly, the effect of this cooling cannot be brought about quickly enough. Another known solution is to divide the application plate into individual blocks by means of slots, the purpose of which is to improve the expansion capability of these blocks in the peripheral direction. Yet another known solution is to increase the area of the friction surfaces which participate in the transmission of the torque.

Clutch discs, or clutch plates of the general type described above are known. That is, friction clutches having the basic components of a hub, hub disc, lining support, and friction linings, or rings, are generally known. However, it has been determined that such known friction rings do not perform as well as can be expected. For example, during periods of increased usage of such clutches, such as repeatedly starting on an uphill slope, the friction linings can heat up and warp, thereby reducing frictional engagement with the opposing frictional surfaces, which could be the surface of an engine flywheel and an engagement surface of the clutch.

OBJECT OF THE INVENTION

The object of this invention is to create a friction clutch of the type described above so that, with the least possible effort and expense, the application of a sudden thermal peak load results in only a small reduction in the transmission capability.

An additional object of this invention is to increase the transmission capability of such a clutch disc, at the least possible expense.

SUMMARY OF THE INVENTION

The invention teaches that the above objects can be accomplished by means of the following features. By increasing the inside diameter of the application plate while retaining the outside diameter, to obtain a diameter ratio $D_A$ (outside diameter) to $D_I$ (inside diameter) of less than 1.4, it is possible to positively affect the deformation or warping behavior of the application plate so that in spite of the reduction of the area of the friction surface, the transmission capability remains essentially unchanged, even in the event of the sudden application of a thermal load. This behavior can be explained by the fact that the friction surfaces which participate in the torque transmission are reduced only insignificantly. At the same time, with the enlargement of the inside diameter, the effective friction radius is increased. The invention also teaches that the same effect can be achieved by keeping the inside diameter the same and reducing the outside diameter of the application plate. It thereby becomes possible to reduce the overall outside diameter of the clutch.

In accordance with another feature of the invention, it is advantageous if the diameter ratio is preferably in the range of 1.38 to 1.25. Given the relatively thin application plates currently required, it is clear that the maximum transmission capability of the friction clutch occurs in this range. When the diameter ratio drops significantly below 1.3, the negative influences resulting from the reduction of surface area become predominant, namely the increasing specific thermal load on the linings and the reduced heat absorption capability, which is proportional to the mass.

In accordance with another feature, the invention teaches that the friction linings of the clutch disc are provided with a lining suspension system which has a residual spring travel to compensate for the deformation of the application plate when the friction clutch is in the engaged position. In particular when the diameter ratio of the application plate is accompanied by a satisfactory lining suspension system, the improvement which can be achieved in the clutch with regard to the application of an extreme load becomes clearly apparent, and this effect is significantly greater than the positive effects which can be obtained by providing a large surface area of the lining and a large mass of the application plate.

The present invention also teaches that the objects can be achieved by providing a clutch disc for a friction clutch, wherein the clutch disc has at least one friction ring, which at least one friction ring has an inside diameter and an outside diameter, and wherein the friction ring is preferably configured such that the ratio of the outside diameter ($D_a$) to the inside diameter ($D_i$) is less than or equal to about 1.4.

Surprisingly, it has been determined that when the ratio of the outside diameter to the inside diameter ($D_a/D_i$) is less than or equal to about 1.4, the transmission capability of the clutch disc can assume a greater value than can be achieved with a friction clutch having clutch discs with a conventional diameter ratio. Such a conventional diameter ratio could possibly be on the order of about 1.5, or even possibly greater.

By experimentally reducing the diameter ratio, it was determined that less warpage of the friction rings occurred during periods of heating of the friction rings. On the other hand, this reduction of warpage by reducing the diameter ratio needed to be offset by the fact that sufficient friction material still needed to be present to provide the necessary frictional engagement of the clutch, while maintaining the overall size of the components essentially the same. Thus, essentially at least the above three factors needed to be considered in optimizing the diameter ratio of the friction rings.

As indicated above, the increase in transmission capability for a friction lining having a reduced diameter ratio is essentially due to the fact that during the frictional phase of the friction clutch, that is, during periods of slippage prior to complete engagement, and during the heating of the friction rings, the friction rings in accordance with the present invention, are typically subjected to a lower degree of warping when they have the diameter ratio as provided by the present invention. Thus, with a reduced amount of warpage, a greater proportion of the friction surfaces of the friction rings can remain in contact with the opposite friction surfaces of the friction clutch. As such, the heat of friction which is generated can be distributed more uniformly to the material in the friction rings, and thus the peak loads on the friction rings can be significantly reduced.

The present invention also teaches that the ratio of the outside diameter of the friction rings to the inside diameter can be in the range of about 1.25 to about 1.38. It has been determined that in this range, there can be a maximum of transmission capability without the need to take any additional measures. In other words, there can still be a sufficient amount of friction material present to provide the necessary frictional engagement, while the amount of warpage can be reduced to provide more efficient heat distribution throughout the clutch discs during periods of increased heat generation.

In one particularly advantageous configuration of the friction rings, the ratio of the diameters can be in the range of about 1.3. This diameter ratio has been experimentally determined to represent essentially an optimum between a low degree of warping when the temperature is increased as a result of friction during the friction process and the heat capacity of the friction rings.

In a further advantageous embodiment of the present invention, on a clutch plate on which there are two friction rings fastened to the support with the interposition of a spring device which acts essentially in the axial direction, the present invention also teaches that when the friction clutch is essentially fully engaged, there should still be a remaining spring travel. It has been determined that such a remaining spring travel essentially can make it possible for the friction rings to slightly "give" elastically, to a certain extent, when there is warping caused by temperature stress. The present invention teaches that this remaining spring travel can be between about 0.10 mm and about 0.30 mm. Such a remaining spring travel is essentially sufficiently large, on one hand, to achieve the desired effect, and on the other hand the space occupied by the remaining spring travel is still essentially sufficiently small.

Further details regarding the present invention are presented herebelow with reference to the accompanying drawings. It should be understood that when the word "invention" is used in this application, the word "invention" includes "inventions", that is, the plural of "invention". By stating "invention", the Applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

In summary, one aspect of the invention resides broadly in a method of producing a friction clutch for a motor vehicle, using the friction clutch, and, during use of the friction clutch, increasing transmission capability of the friction clutch for transmitting rotary power of an engine to a drive train of a motor vehicle during periods of increased frictional heating of the friction clutch, the friction clutch comprising: a housing; a clutch disc disposed within the housing and defining an axis of rotation and an axial direction parallel to the axis of rotation; pressure plate apparatus for axially moving the clutch disc within the housing to engage the clutch disc with a rotating member of an engine of a motor vehicle; and apparatus for moving the pressure plate apparatus away from the clutch disc to relieve engagement between the clutch disc and a rotating member of an engine of a motor vehicle; the clutch disc comprising: hub apparatus, the hub apparatus having a hub for engaging shaft apparatus of a transmission and a hub disc disposed about the hub; and at least one friction lining disposed with the hub disc for being engaged between the pressure plate apparatus and a rotating member of an engine of a motor vehicle; the at least one friction lining having a surface area, an inner diameter and an outer diameter; the method comprising the steps of: mass producing a plurality of friction linings, the mass producing comprising forming each of the plurality of friction linings to comprise a diameter ratio of outer diameter to inner diameter of less than about 1.4 to 1; mass assembling at least one of the plurality of friction linings with a hub disc; mass assembling a plurality of hub discs with a plurality of hubs to form a plurality of clutch discs; mass assembling at least one pressure plate apparatus, at least one clutch disc, and at least one apparatus for moving the pressure plate apparatus within a plurality of housings to form a plurality of friction clutches; mass assembling one friction clutch with each of a plurality of transmissions to form at least a portion of a plurality of drive trains; mass assembling a plurality of motor vehicles, the mass assembling a plurality of motor vehicles comprising mass assembling at least a portion of the drive trains into each of the plurality of motor vehicles; and the method further comprising the steps of operating the motor vehicle, the steps of operating the motor vehicle comprising:

a) disengaging the at least one friction lining from a rotating member of the engine of the motor vehicle to disengage the transmission from the rotating member of the engine and at least reduce movement of the motor vehicle;

b) re-engaging the at least one friction lining with the rotating member of the engine of the motor vehicle to re-engage the transmission with the rotating member of the engine to increase movement of the motor vehicle;

c) repeating the disengaging and re-engaging to respectively at least reduce movement, and increase movement of the motor vehicle;

d) slipping the rotating member of the engine against the at least one friction lining prior to engagement of the at least one friction lining with the rotating member;

e) generating heat during the slipping and heating the at least one friction lining, the at least one friction lining warping upon heating of the at least one friction lining to a first degree;

warping the at least one friction lining having the diameter ratio of less than about 1.4:1, to a first amount at the first degree of heating generated by steps a, b, c, d and e, the first amount of warping being less than a second amount of warping of a friction lining having a diameter ratio of substantially greater than about 1.4:1, at the first degree of heating generated by steps a, b, c, d and e; maintaining a proportion of the surface area of the at least one friction lining having the diameter ratio of less than about 1.4:1, available for engaging with the rotating member of the engine, the available proportion of the surface area of the at least one friction lining having the diameter ratio of less than about 1.4:1 being greater than an available proportion of a surface area of a friction lining having a diameter ratio of substantially greater than about 1.4:1; and the available proportion of the surface area of the at least one friction lining having the diameter ratio of less than about 1.4:1, providing a greater transmission capability than a transmission capability provided by an available proportion of the surface area of a friction lining having a diameter ratio of substantially greater than about 1.4:1.

Another aspect of the invention resides broadly in a mass-produced clutch disc for a mass-produced friction clutch, the mass-produced clutch disc comprising: a mass-produced hub for being non-rotationally connected to a transmission shaft, the hub defining an axis of rotation; a mass-produced hub disc disposed concentrically about the hub and extending radially away from the hub; at least one mass-produced friction lining disposed with the hub disc, the at least one mass-produced friction lining for being engaged between pressure plate apparatus of a friction clutch and a rotating member of an engine; the mass-produced hub disc comprising support apparatus for supporting the at least one mass-produced friction lining concentrically about the mass-produced hub disc and concentrically to the axis of rotation; and the at least one mass-produced friction lining comprising a ring shaped friction lining having an inner diameter disposed about the mass-produced hub and an outer diameter disposed about the inner diameter; and a ratio of the outer diameter to the inner diameter being less than about 1.4 to 1 to maximize heat absorption by the at least one friction lining and minimize warpage of the at least one mass-produced friction lining during use of the at least one mass produced friction lining in the mass-produced friction clutch.

A further aspect of the invention resides broadly in a friction lining in a mass-produced friction clutch comprising: a housing; a clutch disc disposed within the housing, the clutch disc defining an axis of rotation and an axial direction parallel to the axis of rotation; pressure plate apparatus disposed within the housing and movable in the axial direction, the pressure plate apparatus for applying an axial force to the clutch disc along the axial direction; biasing apparatus for biasing the pressure plate apparatus in the axial direction to apply the axial force to the clutch disc; the clutch disc comprising: a hub, the hub comprising apparatus for engaging shaft apparatus of a transmission, and the hub having a diameter and a circumference; a hub disc disposed concentrically about the hub and extending radially away from the hub, the hub disc having a first side and a second side; a friction lining, the friction lining comprising: a ring shaped friction lining having an inside diameter and an outside diameter; and a ratio of the outside diameter to the inside diameter being less than or equal to about 1.4 to 1.

BRIEF DESCRIPTION OF THE DRAWINGS

The invention is explained in greater detail below with reference to the embodiments illustrated in the accompanying drawings, in which.

DESCRIPTION OF THE PREFERRED EMBODIMENT

Figure 1:
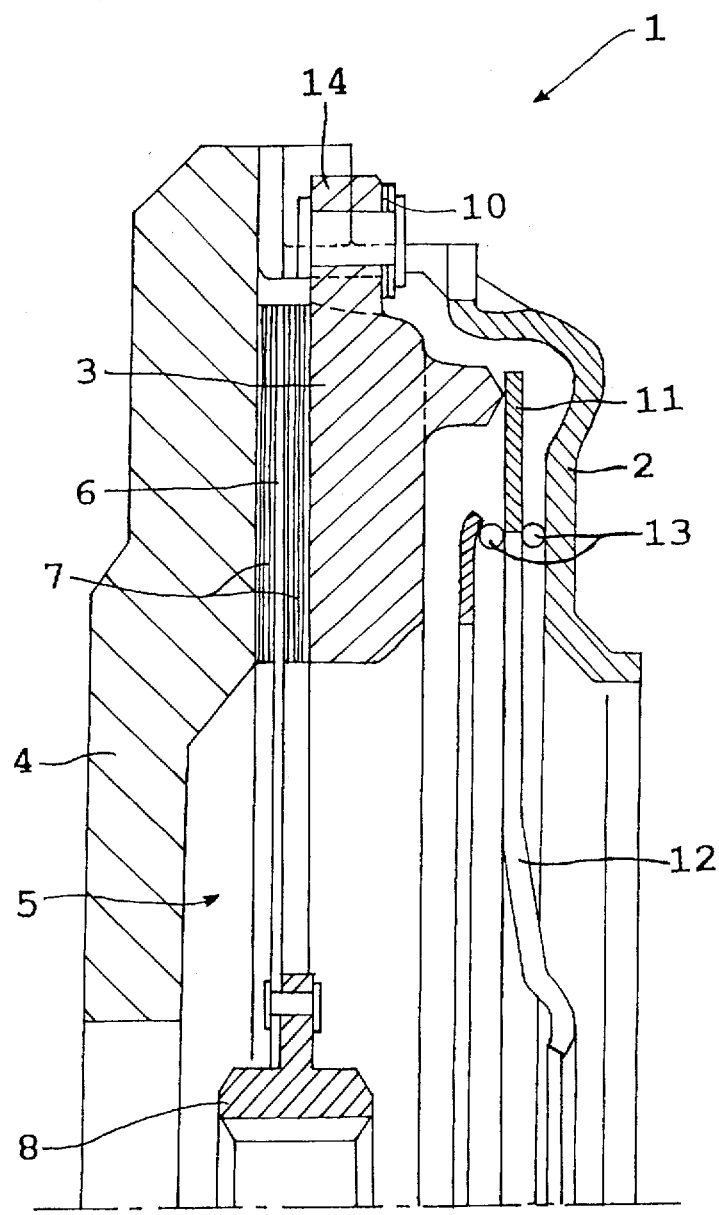
FIG. 1 is a longitudinal section through the upper half of a friction clutch.

The friction clutch illustrated in FIG. 1 has a counter-application plate 4 which is in the form of a flywheel, and which is fastened to a crankshaft (not shown) of an internal combustion engine. Firmly connected to the counter-application plate 4 is the clutch housing 2, to which clutch housing 2 an application plate 3 is connected non-rotationally but so that it can move in the axial direction.

This fastening is achieved by means of a plurality of lugs 14 which project radially outward from the periphery of the application plate 3, which lugs are connected to the clutch housing 2 by means of tangential leaf springs 10. Between the clutch housing 2 and the application plate 3 there is a membrane spring 11 which is supported on an intermediate diameter by means of wire rings 13 and spacer bolts (not shown) on the clutch housing 2, which membrane spring 11 is in contact under bias in the vicinity of its outside diameter against the application plate 3. For this purpose, the application plate 3 is provided in this area with a contact bead or similar device. The membrane spring 11 is provided on the radial inside with flexible tabs or fingers 12 which interact with a release system (not shown). Between the application plate 3 and the counter-application plate 4, a clutch disc 5 with its friction linings 7 is clamped, whereby a lining carrier 6 with an axial suspension system, such as, for example, the system shown in FIGS. 4 and 4a, which axial suspension system provides axial flexibility for the friction linings 7. The clutch disc 5 is non-rotationally mounted by means of a hub 8 on a transmission shaft (not shown) which defines an axis of rotation 9. All the parts of the friction clutch 1 are installed so that they can rotate around the axis of rotation 9.

Figure 2:
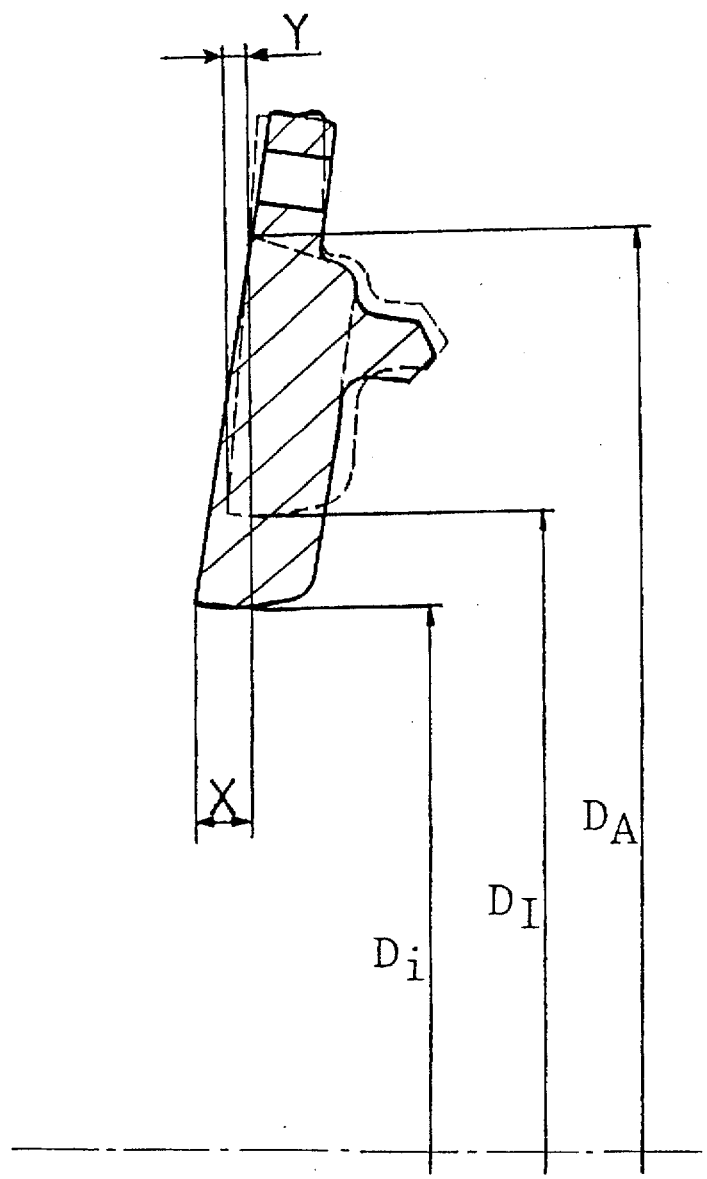
FIG. 2 is a longitudinal section through the upper half of the application plate when it is deformed.

In the event of several starts in quick succession of a motor vehicle which has a friction clutch 1, in particular on a hill and with a heavy load, the friction surface of the application plate 3 heats up so rapidly as a result of friction between the application plate 3 and the clutch disc 5 that the heat cannot be promptly dissipated. As a result of its volume, the application plate 3 has a certain thermal absorption capability, but it is essentially no longer possible to use application plates which have such a large mass that the temperature increase can be kept within safe limits. There is simply not enough space in modern vehicles, and attempts must therefore typically be made to reduce the size of the rotating masses in order to improve performance. Under the conditions described above, the application plate 3 can undergo a deformation as illustrated in FIG. 2. The application plate 3 is deformed conically, because the friction surface is at a significantly higher temperature than the reverse side. The deformation is counteracted by the resistance moment of the application plate 3, which must be considered as an essentially ring-shaped element. With the increasing trend toward the reduction of the mass of the application plate 3, the application plate 3 is also becoming thinner, and thus its moment of resistance is also reduced, as a result of which its deformation increases. As long as the limit of elasticity of the material of the application plate 3 in the vicinity of the friction surface is not exceeded in the event of such a heating process, the process is reversible, and the application plate will return to its normal shape when it cools.

As a result of the imposition of a specified diameter ratio $D_A$ (outside diameter) to $D_I$ (inside diameter) of less than about 1.4, preferably from about 1.38 to 1.25, as shown by the contour illustrated in broken lines in FIG. 2, it is possible to significantly reduce the deformation process in thin plates. It is thereby possible, in spite of a smaller friction surface, to achieve a higher transmission moment of the friction clutch 1 during the heating process, since a significantly larger surface area of the friction linings 7 participates in the transmission of the torque. The magnitude of the deformation is illustrated in FIG. 2 by X for a conventional application plate, and by Y for an application plate in accordance with the present invention. In accordance with one embodiment $D_i$ can be considered to represent the inside diameter of a conventioanl application plate. The transmission capability of a friction clutch 1 which has a severely and unilaterally heated application plate 3 is reduced not only as a result of the higher temperature on the friction surfaces, which reduces the coefficient of friction, but also because the application plate 3 is deformed as illustrated in FIG. 2, and the average friction radius is reduced toward the radial inside. When the application plate 3 is realized in accordance with the present invention with a larger inside diameter and with an outside diameter which is essentially unchanged, in addition to the reduced deformation, the average friction radius is also increased.

An additional improvement in starting performance in the event of the sudden application of heavy loads which generate heat of friction can be achieved by providing a satisfactory suspension system for the friction linings 7 on the lining carrier 6. Such a suspension of the friction linings can be adapted, to a certain extent, to the deformation of the application plate 3, so that not only the radially inner area of the friction linings 7 must transmit torque during the starting procedure. The entire solution taught by the invention is also theoretically applicable to the counter-application plate 4, but the counter-application plate 4 is typically not as seriously threatened by this phenomenon, since the counter-application plate 4 has a significantly greater mass, which means that the heat is more rapidly dissipated from the friction surface into the other areas.

One feature of the invention resides broadly in the friction clutch, in particular for motor vehicles, comprising a driven counter-application plate in the form of a flywheel, a clutch housing which is firmly attached to the counter-application plate, and an application plate which is mounted on the clutch housing non-rotationally but so that it can move axially, which application plate can be pressurized by a clutch spring toward the counter-application plate for the frictional clamping of a clutch disc with friction linings between the application plate and the counter-application plate, characterized by the fact that to optimize the transmission of torque, the application plate 3 has a ratio of the outside diameter ($D_A$) to the inside diameter ($D_I$) of less than 1.4.

Another feature of the invention resides broadly in the friction clutch characterized by the fact that the diameter ratio is preferably in the range of 1.38 to 1.25.

Yet another feature of the invention resides broadly in the friction clutch characterized by the fact that the friction linings 7 of the clutch disc 5 are provided with a lining suspension system 6 which has a residual spring travel when the friction clutch is in the engaged position.

Figure 3:
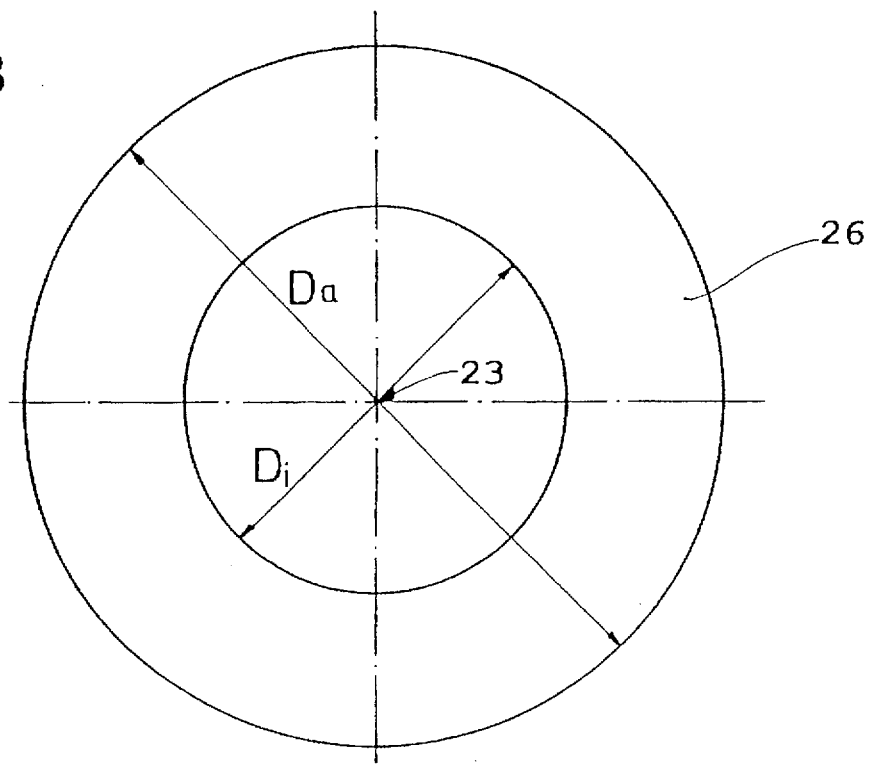
FIG. 3 shows a plan view of a friction ring.
Figure 3A:
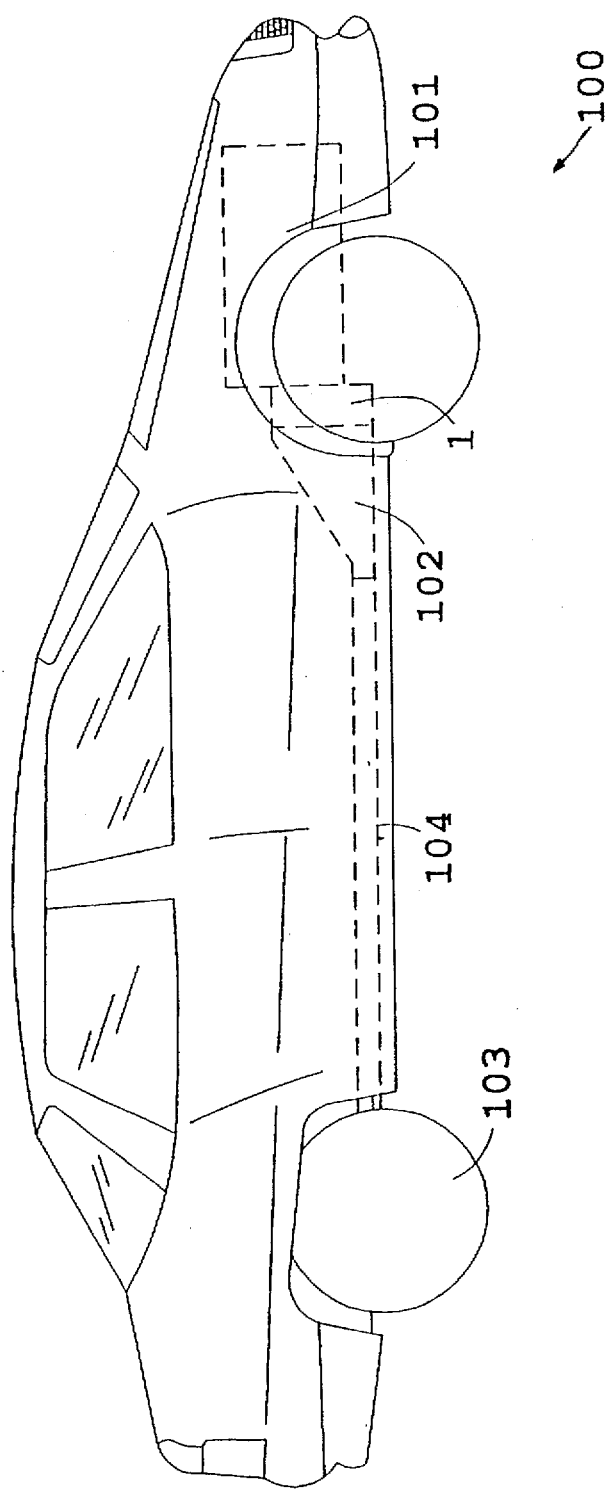
FIG. 3a shows a general depiction of a motor vehicle power train.

A depiction of a motor vehicle and corresponding power transmission components is shown in FIG. 3a, wherein the motor vehicle 100 could typically have an internal combustion engine 101 mounted in a forward portion thereof. The motor vehicle 100 could also typically have a transmission 102 for transmission of mechanical power from the engine 101 to the rear vehicle wheels 103 via a drive shaft 104. A friction clutch 1 could be provided, in accordance with the present invention, for engaging the transmission 102 with the engine 101.

In the following discussion, it should be understood, that use of the terminology "clutch plate" can be interchangeable with the terminology "clutch disc", and likewise that "friction linings" can be interchangeable with "friction rings".

Figure 3B:
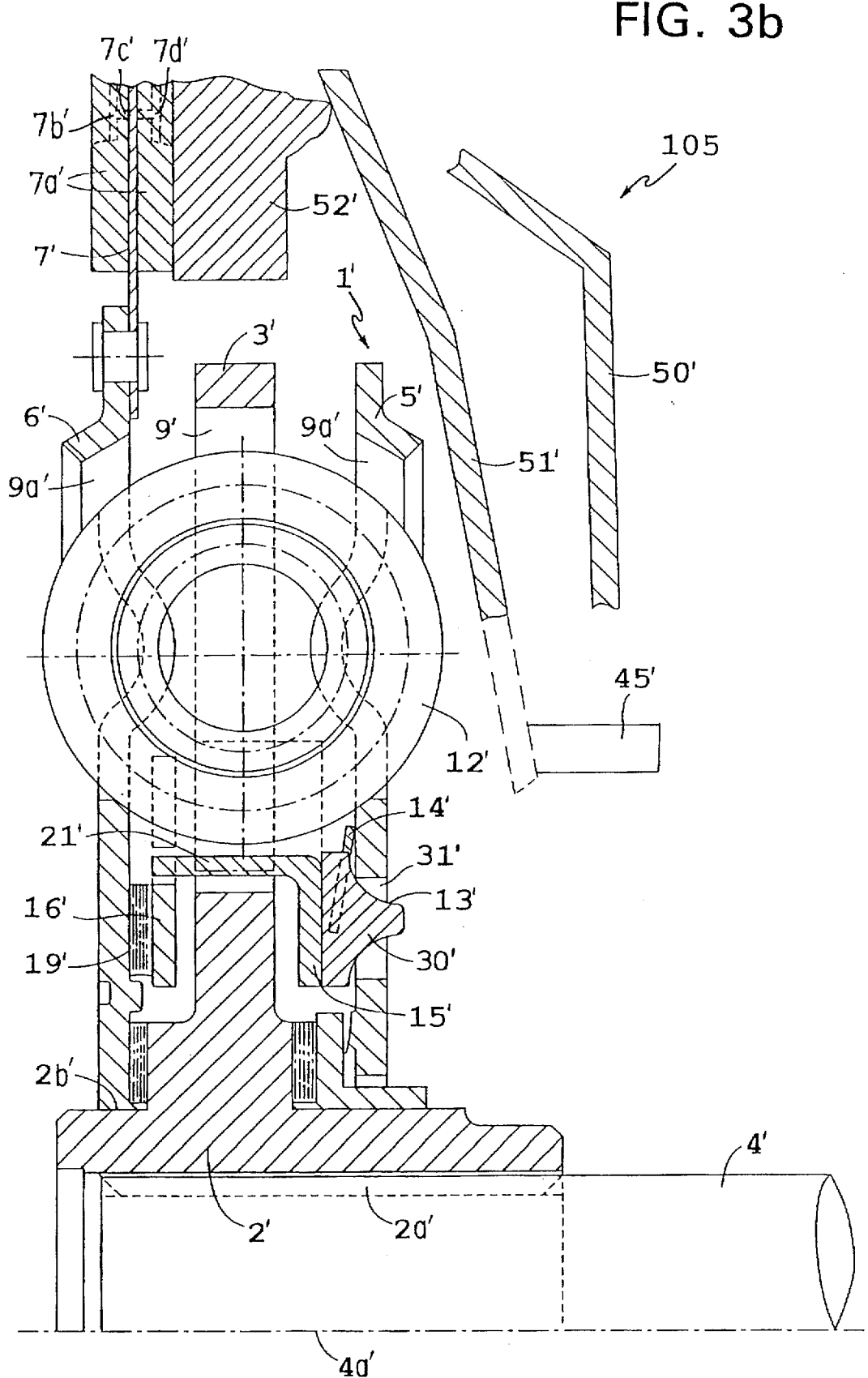
FIG. 3b shows a sectional view of a friction clutch.

FIG. 3b shows one embodiment of a friction clutch 105 in which the present invention could be utilized. It should be understood that components discussed above can be considered to be interchangeable with similar components discussed herebelow. As shown in FIG. 3b, a friction clutch 105 can generally have a clutch disc 1', which clutch disc 1' can have a hub 2' that can be configured to be mounted non-rotationally on a transmission shaft 4'. Such a mounting can be provided, for example, by means of a toothing 2a' disposed within the hub 2', which toothing 2a' would be configured to correspond to similar toothing on the transmission shaft 4'. In general, the transmission shaft 4' defines an axis of rotation 4a', about which the hub 2' rotates.

As is also shown in partial section in FIG. 3b, the friction clutch 105 could also have a housing 50' for housing the components of the clutch 105 therein. Within the friction clutch 105, the hub 2' of the clutch plate 1' can preferably be provided with a hub disc 3', which hub disc 3' can be integral with the hub 2', and which hub disc 3' can point radially outward from the hub 2'.

On both sides of the hub disc 3', cover plates 5' and 6' can preferably be provided, which cover plates 5' and 6' can be fixed in relation to one another, and held at an axial distance in relation to one another. At least one of the two cover plates, for example, the cover plate 6', as shown in FIG. 3b, in its radially outer region, can have a lining support 7', to which friction linings 7a' can be fastened. The two cover plates 5' and 6', for example, can be guided in the radial direction, by means of a bore in one of the two cover plates 5', 6', on a cylindrical guide surface 2b' of the hub 2', as also shown in FIG. 3b.

As shown in FIG. 3b, the friction rings 7a' can be connected to one another and to the lining support 7' by means of a fastening rivet 7b', which fastening rivet 7b' runs through a passage 7c'. The rivets 7b' can preferably form a non-detachable connection to the corresponding lining supports 7' by means of a rivet head 7d', which holds the rivet 7b' in place. The rivet 7b', rivet head 7d' and passage 7c' are further illustrated in FIG. 4a.

Within the housing 50' there could also be a pressure plate device 52' for applying an axial force to the friction linings 7a' to engage the linings 7a' with a counterthrust plate (not shown) which would essentially be rotating with the engine, to thereby cause the hub disc 3' to also rotate with the engine and turn the shaft 4'. The pressure source for applying this axial pressure to the pressure plate device 52' could be a biasing member, such as a spring device 51', which can bias the pressure plate 52' away from the housing 50' into engagement with the friction linings 7a'. In addition, as shown schematically in FIG. 3b, a pressure release device 45' can be provided for relieving the pressure of the pressure plate 52' on the friction linings 7a'. Such a device 52' can in essence work against the biasing force of spring device 51'. Such arrangements of pressure plate device 52', biasing members 51', pressure relief device 45' and housing 50' are generally well known, and are therefore shown only schematically in the figures.

In the hub disc 3' there will typically be windows 9' in which windows, coil springs 12' will generally be disposed. These coil springs 12' can essentially be disposed about the hub disc 3' over the same average diameter from the axis of rotation 4a', and can also essentially be uniformly placed about the circumference. Similar windows 9a' will typically be located in the cover plates 5' and 6' also for receiving the springs 12' therein.

As shown in FIG. 3b, additional components can be provided radially inside the coil springs 12' and between the cover plates 5' or 6' and the hub disc 3'. On the one side there can be a friction ring 13' with lugs 30' that can be guided in openings 31' of the cover plate 5', a spring 14', and a control plate 15'. On the opposite side there can be a thrust ring 16' and a friction ring 19'. The control plate 15' and thrust ring 16' can be held non-rotationally to one another and at an axial distance from one another, by means of axially-bent tabs 21', which can be provided on either one, or both parts.

Figure 4:
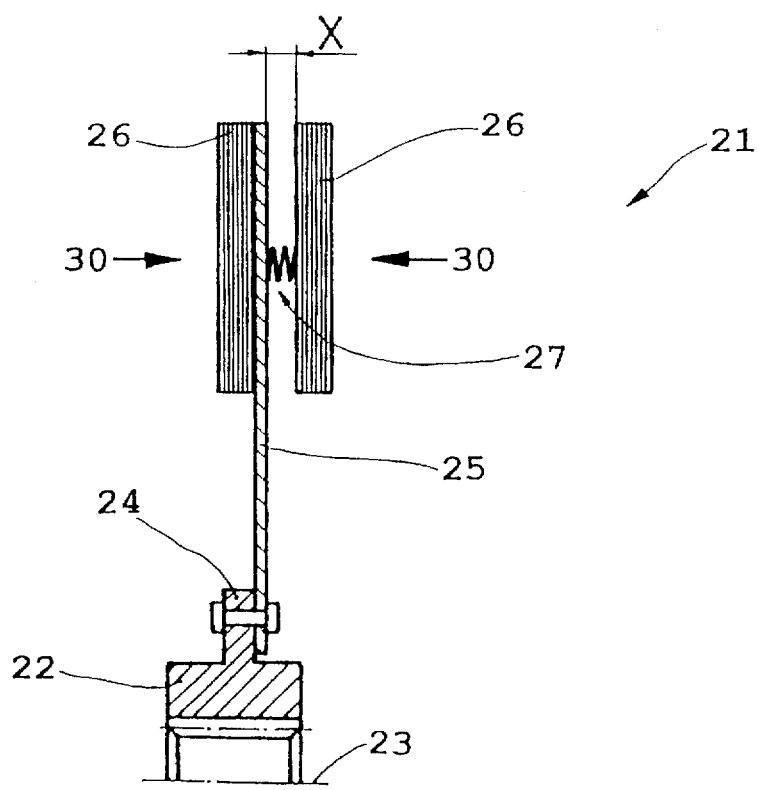
FIG. 4 shows a section through the upper half of a clutch plate with the use of friction rings.
Figure 4A:
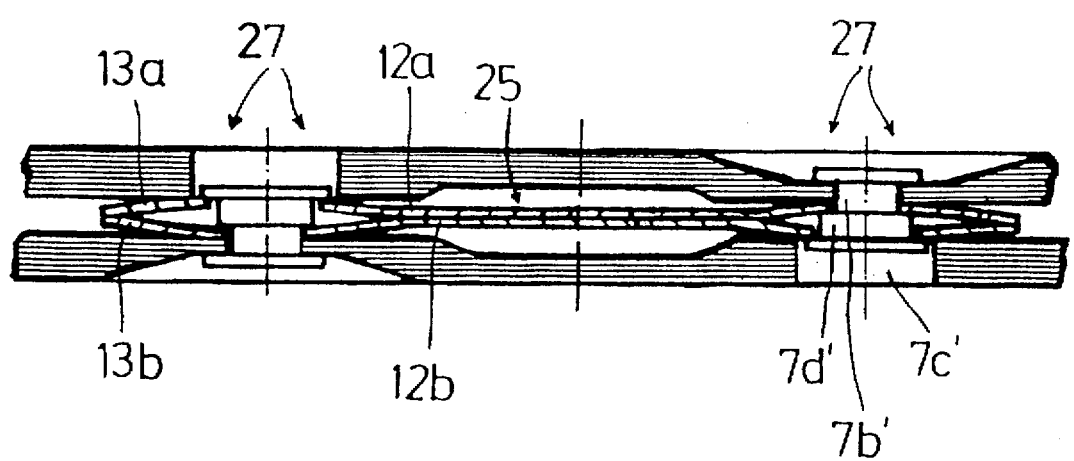
FIG. 4a shows one possible embodiment of a spring device disposed between adjacent friction rings.

It should generally be understood that the embodiments of the friction rings and lining supports as presented herebelow with reference to FIGS. 3, 4 and 4a, can preferably be interchangeable with the embodiment of the friction clutch as presented hereabove with reference to FIG. 3b.

Referring now to the simplified depiction of a clutch disc as shown in FIG. 4, a clutch plate 21 can typically be oriented concentric to an axis of rotation 23. The clutch plate 21 can essentially comprise a hub 22 which can be installed non-rotationally on a transmission shaft (not shown in FIG. 4). Located on the hub 22, there can be a hub disc 24, to which hub disc 24 there can be fastened a support 25 which can extend radially outwardly from the hub 22. There can also be a torsional vibration damper (not shown in FIG. 4, but essentially represented by the coil springs 12' as shown in FIG. 3b) on the support 25 or between the support 25 and the hub disc 24.

In the radially outer area of the support 25, there can be at least one friction ring 26, and preferably two friction rings 26 fastened one on each side, whereby there can preferably be a spring device 27 (shown schematically) between the two friction rings 26. One type of such spring device 27 can possibly be provided as depicted in FIG. 4a, wherein the lining support 25 can be formed by a pair of corrugated metal plates 12a, 12b, with the corrugations 13a, 13b, being of a size sufficient to act as biasing members. Such a spring device 27, for example, can be active both between two friction rings 26 and also between one friction ring 26 and the support 25.

As shown in FIG. 3, a friction ring 26 can have an inside diameter ($D_i$) and an outside diameter ($D_a$), wherein one can determine a ratio of the outside diameter ($D_a$) to the inside diameter ($D_i$). It has surprisingly been found that this ratio should be less than or equal to about 1.4. More particularly, this ratio can preferably be between about 1.25 and about 1.38, while, in at least one configuration the ratio can essentially be in the range of approximately 1.3. In this range for the diameter ratio, the clutch plate 21 can absorb a maximum amount of heat generated by friction, as is generated, for example, when the vehicle is repeatedly required to start on an uphill slope.

The absorption of the heat generated by friction can be increased further by providing the spring device 27 which, when the clutch is fully engaged and there is a corresponding load on the friction rings 26 from the pressure plate and the counterpressure plate of the friction clutch, as shown by the arrows 30 in FIG. 4, has a remaining spring travel (X). This remaining spring travel (X) can advantageously be in the range from about 0.10 mm to about 0.30 mm. (Shown exaggerated in FIG. 4 for purposes of illustration only.)

Clutch discs, can, for example, have an outer diameter in the range of between about 22.50 cm and about 22.70 cm. For example, a clutch disc manufactured by Sachs, West Germany, and having part No. 18-1861 969 301, has friction linings with an outside diameter of about 22.70 cm and an inside diameter of about 15.00 cm, while a clutch disc manufactured by Ford Motor Company and having part No. E57A7550GA, has friction linings with an outside diameter of about 22.50 cm and an inside diameter of about 14.90 cm. As such, both of these two known clutch discs have friction linings with diameter ratios of about 1.51.

In the context of the size of such known friction linings, a friction lining having a diameter ratio of about 1.3, could have an outside diameter of between about 21 cm to about 24 cm. Even more specifically the outer diameter could be between about 22.50 cm and 22.70 cm with a corresponding inside diameter in the range of between about 17.30 and 17.45. Alternatively, other sizes of friction linings would be possible, and variations on the available sizes would be well within the skill of the artisan. For example, for large motor vehicles, such as trucks, etc, the friction linings may be of a size of up to about 30 cm, or even greater, and for small vehicles, the size might be as small as possible 15 cm, or less. As such, the external diameter could possibly have a value of 15 cm, 16 cm, 17 cm, 18 cm, 19 cm, 20 cm, 21 cm, 22 cm, 23 cm, 24 cm, 25 cm, 26 cm, 27 cm, 28 cm, 29 cm and 30 cm.

One could maintain the diameter ratio in a number of ways. For instance, if it was desirable to maintain the outside diameter of a friction lining the same size as commonly used in the past, the inside diameter could be enlarged to provide the desired ratio. Further, if it was desirable to reduce the overall diameter of the friction linings while maintaining the same inside diameter, only the outside dimension of the friction linings would need to be reduced. Alternatively, it might be desirable that a friction lining have the same surface area as has commonly been used in the past. As such, both the inside and outside diameters would essentially need to be enlarged to a degree at which such a ratio was attainable, while preserving the surface area.

One further aspect of the present invention resides broadly in the manufacture and use of a clutch disc having the diameter ratio in accordance with the present invention in a transmission of a motor vehicle, or even more particularly to the use of such a clutch disc in a large number of mass produced motor vehicles, wherein the clutch disc itself, is also mass produced. The concept of mass production in essence, can possibly refer to the production of at least hundreds of units per day, and can possibly range up to the production of thousands of units per day. As such, a large number of such friction rings can be mass produced, the friction rings can then preferably be assembled in mass production with additional components, such as the hub and lining supports, to form friction discs. The mass produced friction discs can then be further assembled in mass production with additional components to form a friction clutch assembly. The friction clutch assemblies can then be installed in the transmission of motor vehicles during the mass production of the motor vehicles.

During operation of a motor vehicle equipped with friction discs, peak loads on the friction linings can then be significantly reduced. In operation of a motor vehicle, during a starting operation, the clutch of the motor vehicle is disengaged. Once the engine is running, and to begin movement, the clutch is re-engaged so that the friction linings can come into contact with the engine flywheel, during initial contact, the friction linings will slip with respect to the flywheel, thereby generating heat from the friction of the slippage. Then, the friction discs will engage with the engine flywheel, and rotate therewith to rotate the transmission of the motor vehicle.

During repeated startings and stoppings of the motor vehicle, there will be an increased number of periods of time when the slippage is occurring between the engine flywheel and the friction discs. During such frequently repeated instances of slippage, heat dissipation may not be able to occur quickly enough and heat can build up in the friction discs, and warpage can occur. Once warpage occurs, portions of the discs may no longer contact the engine flywheel, and the transmission capability of the clutch is typically reduced. Such warpage can also worsen the distribution of heat, as only the portions of the discs in contact with the flywheel will be heated, and these portion will typically be heated to a greater degree, thereby making the possibility of even greater warpage likely.

Instances as outlined above, wherein a motor vehicle is repeatedly needing to be stopped and then moved again, such as in heavy "stop and go" traffic, can be even more pronounced if the motor vehicle is travelling up a hillside, as a greater amount of slippage of the clutch discs would typically occur before engagement. Thus, heating can be even more pronounced. Also, the load of the motor vehicle, that is, the number of passengers, the cargo, or if the motor vehicle is hauling a trailer, or boat, etc., can also adversely affect the heating of the friction discs. In this regard, the greater the load, the greater the amount of slippage that would occur prior to engagement, the greater the amount of heat that would be generated, and the more pronounced the warpage and uneven heat distribution would become.

By providing a motor vehicle transmission with clutch discs as described above, the clutch discs will typically be able to withstand a greater amount of heating before warpage might occur. Thus, a greater surface area of the discs will be available for contact with the engine flywheel, thereby providing an increased transmission capability, and enabling heat distribution to remain more uniform for longer periods of time, thus reducing peak loads on the friction linings.

One feature of the invention resides broadly in the clutch plate for a friction clutch comprising a hub which is non-rotationally installed on a transmission shaft, a hub disc with or without torsional vibration dampers, and a support for two friction rings which are at some axial distance from one another, are oriented concentric to the axis of rotation and are fastened to the support, and which have an inside diameter and an outside diameter, characterized by the fact that the ratio of the outside diameter $(D_a)$ to the inside diameter $(D_i)$ is less than or equal to 1.4.

Another feature of the invention resides broadly in the clutch plate, characterized by the fact that the ratio of the outside diameter $(D_a)$ to the inside diameter $(D_i)$ is in the range from 1.25 to 1.38.

Still another feature of the invention resides broadly in the clutch plate, characterized by the fact that the ratio of the outside diameter $(D_a)$ to the inside diameter $(D_i)$ is in the range of 1.3.

Yet another feature of the invention resides broadly in the clutch plate, whereby the two friction rings are fastened to the support with the interposition of a spring device which acts essentially in the axial direction, characterized by the fact that when the friction clutch is engaged there is a remaining spring travel (X).

Still yet another feature of the invention resides broadly in the clutch plate, characterized by the fact that the remaining spring travel (X) is from 0.10 to 0.30 mm.

One concept of the invention resides broadly in a mass-produced friction clutch, such as a clutch for a motor vehicle, said clutch comprising a housing, a clutch disc disposed within the housing, the clutch disc defining an axis of rotation and an axial direction parallel to the axis of rotation, pressure plate means disposed within the housing and movable in the axial direction, the pressure plate means for applying an axial force to the clutch disc along the axial direction, biasing means for biasing the pressure plate means in the axial direction to apply the axial force to the clutch disc, the clutch disc comprising a hub, the hub comprising means for engaging shaft means of a transmission, and the hub having a diameter and a circumference, a hub disc disposed concentrically about the hub and extending radially away from the hub, the hub disc having a first side and a second side, a friction lining, said friction lining comprising a ring shaped friction lining having an inside diameter and an outside diameter, and a ratio of the outside diameter to the inside diameter being less than or equal to about 1.4 to 1.

Another concept of the invention resides broadly in the friction lining comprising the ratio of the outside diameter to the inside diameter being in a range of from about 1.25:1 to about 1.38:1.

Another concept of the invention resides broadly in the friction lining including the ratio of the outside diameter to the inside diameter being about 1.30:1.

Anther concept of the invention resides broadly in the friction lining further including the outside diameter being between about 21 cm to about 24 cm and the inside diameter being between about 16.2 cm to about 18.5 cm to provide said ratio of about 1.3:1.

Another concept of the invention resides broadly in a mass-produced clutch disc for a mass-produced friction clutch, such as a clutch for a motor vehicle, the mass-produced clutch disc comprising a mass-produced hub for being non-rotationally connected to a transmission shaft, the hub defining an axis of rotation, a mass-produced hub disc disposed concentrically about the hub and extending radially away from the hub, at least one mass-produced friction lining disposed with the hub disc, the at least one mass-produced friction lining for being engaged between pressure plate means of a friction clutch and a rotating member of an engine, the mass-produced hub disc comprising support means for supporting the at least one mass-produced friction lining concentrically about the mass-produced hub disc and concentrically to the axis of rotation; and the at least one mass-produced friction lining comprising a ring shaped friction lining having an inner diameter disposed about the mass-produced hub and an outer diameter disposed about the inner diameter, and a ratio of the outer diameter to the inner diameter being less than about 1.4 to 1 to maximize heat absorption by the at least one friction lining and minimize warpage of the at least one mass-produced friction lining during use of the at least one mass produced friction lining in the mass-produced friction clutch.

Another concept of the invention resides broadly in the mass-produced clutch disc further including said ratio of the outer diameter to the inner diameter being in a range of between about 1.25:1 and 1.38:1.

Another concept of the invention resides broadly in the mass-produced clutch disc further including said ratio of said outer diameter to said inner diameter being about 1.30:1.

Another concept of the invention resides broadly in the mass-produced clutch disc wherein: said at least one friction lining comprises first and second friction linings; said support means comprises means for supporting said first and second friction linings concentrically about said hub and axially spaced apart from one another; said support means comprises biasing member means for biasing said first and second friction linings in an axial direction away from one another; and said biasing member means being configured to define a biasing distance of travel between said first and second friction linings when said friction linings are engaged between pressure plate means of the friction clutch and a rotating member of an engine.

Another concept of the invention resides broadly in the mass-produced clutch disc wherein: said biasing distance of travel with said friction linings engaged between pressure plate means of the friction clutch and a rotating member of an engine is between about 0.10 mm to about 0.30 mm; and said ratio of said outer diameter to said inner diameter is in a range between about 1.25:1 and 1.38:1.

Another concept of the invention resides broadly in the mass-produced clutch disc wherein: said ratio of said outer diameter to said inner diameter is about 1.3:1; said clutch disc further comprises a torsional damper disposed between said support means and said hub disc, said torsional damper comprising a further biasing member for biasing relative rotational movement between said hub disc and said support means; said clutch disc further comprises rivet means for fastening said first and second friction linings to said biasing member means; said biasing member means comprising a metal plate having flexible rounded corrugations disposed radially between said first and second friction linings, said corrugations being flattenable to provide a biasing force; and said outside diameter being between about 21 cm to about 24 cm and said inside diameter being between about 16.2 cm to about 18.5 cm to provide said ratio of about 1.3:1.

Another concept of the invention reside broadly in a method of producing a friction clutch for a motor vehicle, using the friction clutch, and, during use of the friction clutch, increasing transmission capability of the friction clutch for transmitting rotary power of an engine to a drive train of a motor vehicle during periods of increased frictional heating of the friction clutch, the friction clutch comprising: a housing; a clutch disc disposed within the housing and defining an axis of rotation and an axial direction parallel to the axis of rotation; pressure plate means for axially moving the clutch disc within the housing to engage the clutch disc with a rotating member of an engine of a motor vehicle; and means for moving said pressure plate means away from the clutch disc to relieve engagement between the clutch disc and a rotating member of an engine of a motor vehicle; the clutch disc comprising: hub means, said hub means having a hub for engaging shaft means of a transmission and a hub disc disposed about the hub; and at least one friction lining disposed with said hub disc for being engaged between the pressure plate means and a rotating member of an engine of a motor vehicle; the at least one friction lining having a surface area, an inner diameter and an outer diameter; said method comprising the steps of: mass producing a plurality of friction linings, said mass producing comprising forming each of the plurality of friction linings to comprise a diameter ratio of outer diameter to inner diameter of less than about 1.4 to 1; mass assembling at least one of the plurality of friction linings with a hub disc; mass assembling a plurality of hub discs with a plurality of hubs to form a plurality of clutch discs; mass assembling at least one pressure plate means, at least one clutch disc, and at least one means for moving said pressure plate means within a plurality of housings to form a plurality of friction clutches; mass assembling one friction clutch with each of a plurality of transmissions to form at least a portion of a plurality of drive trains; mass assembling a plurality of motor vehicles, said mass assembling a plurality of motor vehicles comprising mass assembling the at least a portion of the drive trains into each of the plurality of motor vehicles; and said method further comprising the steps of operating the motor vehicle, said steps of operating the motor vehicle comprising:

a) disengaging the at least one friction lining from a rotating member of the engine of the motor vehicle to disengage the transmission from the rotating member of the engine and at least reduce movement of the motor vehicle;

b) re-engaging the at least one friction lining with the rotating member of the engine of the motor vehicle to re-engage the transmission with the rotating member of the engine to increase movement of the motor vehicle;

c) repeating said disengaging and re-engaging to respectively at least reduce movement, and increase movement of the motor vehicle;

d) slipping the rotating member of the engine against the at least one friction lining prior to engagement of the at least one friction lining with the rotating member;

e) generating heat during said slipping and heating the at least one friction lining, the at least one friction lining warping upon heating of the at least one friction lining to a first degree;

warping the at least one friction lining having the diameter ratio of less than about 1.4:1, to a first amount at the first degree of heating generated by steps a, b, c, d and e, the first amount of warping being less than a second amount of warping of a friction lining having a diameter ratio of substantially greater than about 1.4:1, at the first degree of heating generated by steps a, b, c, d and e; maintaining a proportion of the surface area of the at least one friction lining having the diameter ratio of less than about 1.4:1, available for engaging with the rotating member of the engine, the available proportion of the surface area of the at least one friction lining having the diameter ratio of less than about 1.4:1 being greater than an available proportion of a surface area of a friction lining having a diameter ratio of substantially greater than about 1.4:1; and the available proportion of the surface area of the at least one friction lining having the diameter ratio of less than about 1.4:1, providing a greater transmission capability than a transmission capability provided by an available proportion of the surface area of a friction lining having a diameter ratio of substantially greater than about 1.4:1.

Another concept of the invention resides broadly in the method further including forming each of the plurality of friction linings to comprise a diameter ratio of outer diameter to inner diameter being in a range of between about 1.25:1 to about 1.38:1 to substantially minimize warping of said at least one friction lining.

Another concept of the invention resides broadly in the method further including the steps of: providing at least first and second friction linings on said hub disc during said mass assembling; providing biasing member means between said first and second friction linings during said mass assembling to bias said first and second friction linings in a direction away from one another; and configuring said biasing member means to have a remaining distance of travel of said first and second friction linings in a direction towards one another when said friction linings are engaged between the pressure plate means and a rotating member of an engine of the motor vehicle.

Another concept of the invention resides broadly in the method further including the steps of: forming each of the plurality of friction linings to comprise a diameter ratio of outer diameter to inner diameter being of about 1.30; configuring said biasing member means to have a remaining distance of travel of between about 0.10 mm to about 0.30 mm; providing friction lining support means on said hub discs for supporting said first and second friction linings concentrically about said hub disc; providing torsional damping means between said friction lining support means and said hub disc; said repeating of said disengaging and said re-engaging comprises repeating said disengaging and said re-engaging while moving the motor vehicle uphill to thereby generate an amount of heat greater than an amount of heat generated on a substantially level road; and forming each of the plurality of friction linings to have an outside diameter of between about 21 cm to about 24 cm.

Another concept of the invention resides broadly in a mass-produced friction clutch for a mass-produced transmission for a mass-produced motor vehicle as produced by the manufacturing process described hereabove.

Another concept of the invention resides broadly in the mass-produced friction clutch wherein the ratio of the outside diameter to the inside diameter is between about 1.25:1 to about 1.38:1 to minimize warpage of said at least one friction lining and maximize heat absorption of said at least one friction lining.

Another concept of the invention resides broadly in the mass-produced friction clutch wherein: said at least one friction lining comprises first and second friction linings, both of said first and second friction linings comprising said diameter ratio of between about 1.25:1 to about 1.38:1; and said clutch disc further comprises means for supporting said first and second friction linings concentrically about said hub disc and spaced apart from one another in an axial direction.

Another concept of the invention resides broadly in the mass-produced friction clutch wherein: said clutch disc further comprises biasing member means disposed between said first and second friction linings for biasing said first and second friction linings in a direction away from one another; and said biasing member means being configured for providing a remaining distance of travel between said first and second friction linings in a direction towards one another when said first and second friction linings are engaged between said pressure plate means and a rotating member of an engine.

Another concept of the invention resides broadly in the mass-produced friction clutch wherein: said ratio of the outside diameter to the inside diameter is about 1.3; and said remaining distance of travel is between about 0.10 mm to about 0.30 mm.

Another concept of the invention resides broadly in the mass-produced friction clutch wherein: said friction clutch further comprises biasing means for biasing said pressure plate means in an axial direction towards the clutch disc to bias one of said first and second friction linings into engagement with a rotating member of an engine; said means for moving the pressure plate means away from the clutch disc comprises a further biasing member; said means for supporting said first and second friction linings comprises: first and second cover plates disposed on opposite sides of said hub disc, said first and second cover plates comprising means for non-rotationally connecting said first and second cover plates with respect to one another; and support member means disposed on one of said first and second cover plate means and extending radially from said one of said first and second cover plates; said support member means comprising said biasing member means for biasing said first and second friction linings away from one another; said support member means comprising a metal sheet, the metal sheet having rounded corrugations forming said biasing member means; said clutch disc further comprises torsional damping means disposed between said first and second cover plate means and said hub disc for damping rotational movement between said first and second friction linings and said hub in engagement with shaft means of a transmission; each of said hub disc and said first and second cover plate means comprise at least one window therethrough, said at least one window of each of said hub disc and said first and second cover plate means being axially aligned with the windows of the others of said hub disc and said first and second cover plate means; said torsional vibration damper comprises at least one spring member disposed in a circumferential direction within said aligned windows; said hub further comprises radially inwardly directed teeth for non-rotationally engaging with radially outwardly direct teeth of shaft means of a transmission; and said outside diameter of said first and second friction linings is between about 21 cm and about 24 cm and said inside diameter corresponds thereto to provide said ratio of about 1.3:1.

Another concept of the invention resides broadly in a method of producing a friction clutch for a motor vehicle, using the friction clutch, and, during use of the friction clutch, increasing transmission capability of the friction clutch for transmitting rotary power of an engine to a drive train of a motor vehicle during periods of increased frictional heating of the friction clutch, the friction clutch comprising: a housing; a clutch disc disposed within the housing and defining an axis of rotation and an axial direction parallel to the axis of rotation; pressure plate means for axially moving the clutch disc within the housing to engage the clutch disc with a rotating member of an engine of a motor vehicle; and means for moving said pressure plate means away from the clutch disc to relieve engagement between the clutch disc and a rotating member of an engine of a motor vehicle; the clutch disc comprising: hub means, said hub means having a hub for engaging shaft means of a transmission and a hub disc disposed about the hub; and at least one friction lining disposed with said hub disc for being engaged between the pressure plate means and a rotating member of an engine of a motor vehicle; the at least one friction lining having a surface area, an inner diameter and an outer diameter; said method comprising the steps of: mass producing a plurality of friction linings, said mass producing comprising forming each of the plurality of friction linings to comprise a diameter ratio of outer diameter to inner diameter of less than about 1.4 to 1; mass assembling at least one of the plurality of friction linings with a hub disc; mass assembling a plurality of hub discs with a plurality of hubs to form a plurality of clutch discs; mass assembling at least one pressure plate means, at least one clutch disc, and at least one means for moving said pressure plate means within a plurality of housings to form a plurality of friction clutches; mass assembling one friction clutch with each of a plurality of transmissions to form at least a portion of a plurality of drive trains; mass assembling a plurality of motor vehicles, said mass assembling a plurality of motor vehicles comprising mass assembling the at least a portion of the drive trains into each of the plurality of motor vehicles; and said method further comprising the steps of operating the motor vehicle, said steps of operating the motor vehicle comprising:

a) disengaging the at least one friction lining from a rotating member of the engine of the motor vehicle to disengage the transmission from the rotating member of the engine and at least reduce movement of the motor vehicle;

b) re-engaging the at least one friction lining with the rotating member of the engine of the motor vehicle to re-engage the transmission with the rotating member of the engine to increase movement of the motor vehicle;

c) repeating said disengaging and re-engaging to respectively at least reduce movement, and increase movement of the motor vehicle;

d) slipping the rotating member of the engine against the at least one friction lining prior to engagement of the at least one friction lining with the rotating member;

e) generating heat during said slipping and heating the at least one friction lining, the at least one friction lining warping upon heating of the at least one friction lining to a first degree;

warping the at least one friction lining having the diameter ratio of less than about 1.4:1, to a first amount at the first degree of heating generated by steps a, b, c, d and e, the first amount of warping being less than a second amount of warping of a friction lining having a diameter ratio of substantially greater than about 1.4:1, at the first degree of heating generated by steps a, b, c, d and e; maintaining a proportion of the surface area of the at least one friction lining having the diameter ratio of less than about 1.4:1, available for engaging with the rotating member of the engine, the available proportion of the surface area of the at least one friction lining having the diameter ratio of less than about 1.4:1 being greater than an available proportion of a surface area of a friction lining having a diameter ratio of substantially greater than about 1.4:1; and the available proportion of the surface area of the at least one friction lining having the diameter ratio of less than about 1.4:1, providing a greater transmission capability than a transmission capability provided by an available proportion of the surface area of a friction lining having a diameter ratio of substantially greater than about 1.4:1.

Another concept of the invention resides broadly in the method further including forming each of the plurality of friction linings to comprise a diameter ratio of outer diameter to inner diameter being in a range of between about 1.25:1 to about 1.38:1 to substantially minimize warping of said at least one friction lining.

Another concept of the invention resides broadly in the method further including the steps of: providing at least first and second friction linings on said hub disc during said mass assembling; providing biasing member means between said first and second friction linings during said mass assembling to bias said first and second friction linings in a direction away from one another; and configuring said biasing member means to have a remaining distance of travel of said first and second friction linings in a direction towards one another when said friction linings are engaged between the pressure plate means and a rotating member of an engine of the motor vehicle.

Another concept of the invention resides broadly in the method further including the steps of: forming each of the plurality of friction linings to comprise a diameter ratio of outer diameter to inner diameter being of about 1.30; configuring said biasing member means to have a remaining distance of travel of between about 0.10 mm to about 0.30 mm; providing friction lining support means on said hub discs for supporting said first and second friction linings concentrically about said hub disc; providing torsional damping means between said friction lining support means and said hub disc; said repeating of said disengaging and said re-engaging comprises repeating said disengaging and said re-engaging while moving the motor vehicle uphill to thereby generate an amount of heat greater than an amount of heat generated on a substantially level road; and forming each of the plurality of friction linings to have an outside diameter of between about 21 cm to about 24 cm.

Another concept of the invention resides broadly in a mass-produced friction clutch for a mass-produced transmission for a mass-produced motor vehicle as produced by the manufacturing process described hereabove.

Another concept of the invention resides broadly in the mass-produced friction clutch wherein the ratio of the outside diameter to the inside diameter is between about 1.25:1 to about 1.38:1 to minimize warpage of said at least one friction lining and maximize heat absorption of said at least one friction lining.

Another concept of the invention resides broadly in the mass-produced friction clutch wherein: said at least one friction lining comprises first and second friction linings, both of said first and second friction linings comprising said diameter ratio of between about 1.25:1 to about 1.38:1; and said clutch disc further comprises means for supporting said first and second friction linings concentrically about said hub disc and spaced apart from one another in an axial direction.

Another concept of the invention resides broadly in the mass-produced friction clutch wherein: said clutch disc further comprises biasing member means disposed between said first and second friction linings for biasing said first and second friction linings in a direction away from one another; and said biasing member means being configured for providing a remaining distance of travel between said first and second friction linings in a direction towards one another when said first and second friction linings are engaged between said pressure plate means and a rotating member of an engine.

Another concept of the invention resides broadly in the mass-produced friction clutch wherein: said ratio of the outside diameter to the inside diameter is about 1.3; and said remaining distance of travel is between about 0.10 mm to about 0.30 mm.

Another concept of the invention resides broadly in the mass-produced friction clutch wherein: said friction clutch further comprises biasing means for biasing said pressure plate means in an axial direction towards the clutch disc to bias one of said first and second friction linings into engagement with a rotating member of an engine; said means for moving the pressure plate means away from the clutch disc comprises a further biasing member; said means for supporting said first and second friction linings comprises: first and second cover plates disposed on opposite sides of said hub disc, said first and second cover plates comprising means for non-rotationally connecting said first and second cover plates with respect to one another; and support member means disposed on one of said first and second cover plate means and extending radially from said one of said first and second cover plates; said support member means comprising said biasing member means for biasing said first and second friction linings away from one another; said support member means comprising a metal sheet, the metal sheet having rounded corrugations forming said biasing member means; said clutch disc further comprises torsional damping means disposed between said first and second cover plate means and said hub disc for damping rotational movement between said first and second friction linings and said hub in engagement with shaft means of a transmission; each of said hub disc and said first and second cover plate means comprise at least one window therethrough, said at least one window of each of said hub disc and said first and second cover plate means being axially aligned with the windows of the others of said hub disc and said first and second cover plate means; said torsional vibration damper comprises at least one spring member disposed in a circumferential direction within said aligned windows; said hub further comprises radially inwardly directed teeth for non-rotationally engaging with radially outwardly direct teeth of shaft means of a transmission; and said outside diameter of said first and second friction linings is between about 21 cm and about 24 cm and said inside diameter corresponds thereto to provide said ratio of about 1.3:1.

Another concept of the invention resides broadly in a mass-produced clutch disc for a mass-produced friction clutch, the mass-produced clutch disc comprising: a mass-produced hub for being non-rotationally connected to a transmission shaft, the hub defining an axis of rotation; a mass-produced hub disc disposed concentrically about said hub and extending radially away from said hub; at least one mass-produced friction lining disposed with said hub disc, said at least one mass-produced friction lining for being engaged between pressure plate means of a friction clutch and a rotating member of an engine; said mass-produced hub disc comprising support means for supporting said at least one mass-produced friction lining concentrically about said mass-produced hub disc and concentrically to the axis of rotation; and said at least one mass-produced friction lining comprising a ring shaped friction lining having an inner diameter disposed about said mass-produced hub and an outer diameter disposed about said inner diameter; and a ratio of said outer diameter to said inner diameter being less than about 1.4 to 1 to maximize heat absorption by said at least one friction lining and minimize warpage of said at least one mass-produced friction lining during use of said at least one mass produced friction lining in said mass-produced friction clutch.

Another concept of the invention resides broadly in the mass-produced clutch disc further including said ratio of said outer diameter to said inner diameter being in a range of between about 1.25:1 and 1.38:1.

Another concept of the invention resides broadly in the mass-produced clutch disc further including said ratio of said outer diameter to said inner diameter being about 1.30:1.

Another concept of the invention resides broadly in the mass-produced clutch disc wherein: said at least one friction lining comprises first and second friction linings; said support means comprises means for supporting said first and second friction linings concentrically about said hub and axially spaced apart from one another; said support means comprises biasing member means for biasing said first and second friction linings in an axial direction away from one another; and said biasing member means being configured to define a biasing distance of travel between said first and second friction linings when said friction linings are engaged between pressure plate means of the friction clutch and a rotating member of an engine.

Another concept of the invention resides broadly in the mass-produced clutch disc wherein: said biasing distance of travel with said friction linings engaged between pressure plate means of the friction clutch and a rotating member of an engine is between about 0.10 mm to about 0.30 mm; and said ratio of said outer diameter to said inner diameter is in a range between about 1.25:1 and 1.38:1.

Another concept of the invention resides broadly in the mass-produced clutch disc wherein: said ratio of said outer diameter to said inner diameter is about 1.3:1; said clutch disc further comprises a torsional damper disposed between said support means and said hub disc, said torsional damper comprising a further biasing member for biasing relative rotational movement between said hub disc and said support means; said clutch disc further comprises rivet means for fastening said first and second friction linings to said biasing member means; said biasing member means comprising a metal plate having flexible rounded corrugations disposed radially between said first and second friction linings, said corrugations being flattenable to provide a biasing force; and said outside diameter being between about 21 cm to about 24 cm and said inside diameter being between about 16.2 cm to about 18.5 cm to provide said ratio of about 1.3:1.

Another concept of the invention resides broadly in a mass-produced friction clutch comprising: a housing; a clutch disc disposed within the housing, the clutch disc defining an axis of rotation and an axial direction parallel to the axis of rotation; pressure plate means disposed within the housing and movable in the axial direction, the pressure plate means for applying an axial force to the clutch disc along the axial direction; biasing means for biasing the pressure plate means in the axial direction to apply the axial force to the clutch disc; the clutch disc comprising: a hub, the hub comprising means for engaging shaft means of a transmission, and the hub having a diameter and a circumference; a hub disc disposed concentrically about the hub and extending radially away from the hub, the hub disc having a first side and a second side; a friction lining, said friction lining comprising: a ring shaped friction lining having an inside diameter and an outside diameter; and a ratio of the outside diameter to the inside diameter being less than or equal to about 1.4 to 1.

Another concept of the invention resides broadly in the friction lining further comprising the ratio of the outside diameter to the inside diameter being in a range of from about 1.25:1 to about 1.38:1.

Another concept of the invention resides broadly in the friction lining further including the ratio of the outside diameter to the inside diameter being about 1.30:1.

Another concept of the invention resides broadly in the friction lining further including said outside diameter being between about 21 cm to about 24 cm and said inside diameter being between about 16.2 cm to about 18.5 cm to provide said ratio of about 1.3:1.

Another concept of the invention resides broadly in a mass-produced friction clutch, such as a clutch for a motor vehicle, said clutch comprising: a housing; a clutch disc disposed within the housing, the clutch disc defining an axis of rotation and an axial direction parallel to the axis of rotation; pressure plate means disposed within the housing and movable in the axial direction, the pressure plate means for applying an axial force to the clutch disc along the axial direction; biasing means for biasing the pressure plate means in the axial direction to apply the axial force to the clutch disc; the clutch disc comprising: a hub, the hub comprising means for engaging shaft means of a transmission, and the hub having a diameter and a circumference; a hub disc disposed concentrically about the hub and extending radially away from the hub, the hub disc having a first side and a second side; a friction lining, said friction lining comprising: a ring shaped friction lining having an inside diameter and an outside diameter; and a ratio of the outside diameter to the inside diameter being less than or equal to about 1.4 to 1, whereby heat absorption by said friction lining is maximized and warpage of said friction lining is minimized.

Another concept of the invention resides broadly in a mass-produced clutch disc for a mass-produced friction clutch, such as a clutch for a motor vehicle, the mass-produced clutch disc comprising: a mass-produced hub for being non-rotationally connected to a transmission shaft, the hub defining an axis of rotation; a mass-produced hub disc disposed concentrically about said hub and extending radially away from said hub; at least one mass-produced friction lining disposed with said hub disc, said at least one mass-produced friction lining for being engaged between pressure plate means of a friction clutch and a rotating member of an engine; said mass-produced hub disc comprising support means for supporting said at least one mass-produced friction lining concentrically about said mass-produced hub disc and concentrically to the axis of rotation; and said at least one mass-produced friction lining comprising a ring shaped friction lining having an inner diameter disposed about said mass-produced hub and an outer diameter disposed about said inner diameter; and a ratio of said outer diameter to said inner diameter being less than about 1.4 to 1, whereby heat absorption by said at least one mass-produced friction lining is maximized, and warpage of said at least one mass-produced friction lining minimized, during use of said at least one mass produced friction lining in said mass-produced friction clutch.

Another concept of the present invention resides broadly in a method of using a friction clutch in a motor vehicle, and, during use of the friction clutch, increasing transmission capability of the friction clutch for transmitting rotary power of an engine to a drive train of a motor vehicle during periods of increased frictional heating of the friction clutch, the friction clutch comprising: a housing; a clutch disc disposed within the housing and defining an axis of rotation and an axial direction parallel to the axis of rotation; pressure plate means for axially moving the clutch disc within the housing to engage the clutch disc with a rotating member of an engine of a motor vehicle; and means for moving said pressure plate means away from the clutch disc to relieve engagement between the clutch disc and a rotating member of an engine of a motor vehicle; the clutch disc comprising: hub means, said hub means having a hub for engaging shaft means of a transmission and a hub disc disposed about the hub; and at least one friction lining disposed with said hub disc for being engaged between the pressure plate means and a rotating member of an engine of a motor vehicle; the at least one friction lining having a surface area, an inner diameter and an outer diameter; said method comprising the steps of: providing at least one friction lining, each of the at least one friction lining comprising a diameter ratio of outer diameter to inner diameter of less than about 1.4 to 1; assembling the at least one friction lining with a hub disc; assembling the hub disc with a hub to form a clutch disc; assembling at least one pressure plate means, at least one clutch disc, and at least one means for moving said pressure plate means within a housing to form a friction clutch; assembling the friction clutch with a transmission to form at least a portion of a drive train; assembling the at least a portion of a drive train into a motor vehicle; and said method further comprising the steps of operating the motor vehicle, said steps of operating the motor vehicle comprising:

a) disengaging the at least one friction lining from a rotating member of the engine of the motor vehicle to disengage the transmission from the rotating member of the engine and at least reduce movement of the motor vehicle;

b) re-engaging the at least one friction lining with the rotating member of the engine of the motor vehicle to re-engage the transmission with the rotating member of the engine to increase movement of the motor vehicle;

c) repeating said disengaging and re-engaging to respectively at least reduce movement, and increase movement of the motor vehicle;

d) slipping the rotating member of the engine against the at least one friction lining prior to engagement of the at least one friction lining with the rotating member;

e) generating heat during said slipping and heating the at least one friction lining, whereby the at least one friction lining is warped upon heating of the at least one friction lining to a first degree;

whereby the at least one friction lining having the diameter ratio of less than about 1.4:1 is warped to a first amount at the first degree of heating generated by steps a, b, c, d and e, the first amount of warping being less than a second amount of warping of a friction lining having a diameter ratio of substantially greater than about 1.4:1, at the first degree of heating generated by steps a, b, c, d and e; whereby a proportion of the surface area of the at least one friction lining having the diameter ratio of less than about 1.4:1 is maintained as available for engaging with the rotating member of the engine, the available proportion of the surface area of the at least one friction lining having the diameter ratio of less than about 1.4:1 being greater than an available proportion of a surface area of a friction lining having a diameter ratio of substantially greater than about 1.4:1; and whereby the available proportion of the surface area of the at least one friction lining having the diameter ratio of less than about 1.4:1 provides a greater transmission capability than a transmission capability provided by an available proportion of the surface area of a friction lining having a diameter ratio of substantially greater than about 1.4:1.

Another concept of the invention resides broadly in the method further including forming each of the plurality of friction linings to comprise a diameter ratio of outer diameter to inner diameter being in a range of between about 1.25:1 to about 1.38:1 whereby warping of said at least one friction lining is substantially minimized.

Another concept of the invention resides broadly in the method further including the steps of: providing at least first and second friction linings on said hub disc during said assembling; providing biasing member means between said first and second friction linings during said assembling to bias said first and second friction linings in a direction away from one another; and configuring said biasing member means to have a remaining distance of travel of said first and second friction linings in a direction towards one another when said friction linings are engaged between the pressure plate means and a rotating member of an engine of the motor vehicle.

Another concept of the invention resides broadly in a mass-produced friction clutch, such as a clutch for a motor vehicle, said clutch comprising: a housing; a clutch disc disposed within the housing, the clutch disc defining an axis of rotation and an axial direction parallel to the axis of rotation; pressure plate means disposed within the housing and movable in the axial direction, the pressure plate means for applying an axial force to the clutch disc along the axial direction; biasing means for biasing the pressure plate means in the axial direction to apply the axial force to the clutch disc; the clutch disc comprising: a hub, the hub comprising means for engaging shaft means of a transmission, and the hub having a diameter and a circumference; a hub disc disposed concentrically about the hub and extending radially away from the hub, the hub disc having a first side and a second side; a friction lining, said friction lining comprising: a ring shaped friction lining having an inside diameter and an outside diameter; a ratio of the outside diameter to the inside diameter being substantially less than 1.5 to 1 and greater than 1.25 to 1; whereby warpage of said friction lining, after repeated starting of said motor vehicle on an uphill slope, is substantially less than in a friction clutch having a friction lining with a ratio of the outside diameter to the inside diameter of 1.5 to 1 and with the same outside diameter; and whereby said clutch disc can withstand a greater amount of heating, before warpage occurs, than in a friction clutch having a friction lining with a ratio of the outside diameter to the inside diameter of 1.5 to 1 and with the same outside diameter.

Another concept of the invention resides broadly in the friction lining further comprising the ratio of the outside diameter to the inside diameter being less than or equal to about 1.38:1.

Another concept of the invention resides broadly in a mass-produced clutch disc for a mass-produced friction clutch, such as a clutch for a motor vehicle, the mass-produced clutch disc comprising: a mass-produced hub for being non-rotationally connected to a transmission shaft, the hub defining an axis of rotation; a mass-produced hub disc disposed concentrically about said hub and extending radially away from said hub; at least one mass-produced friction lining disposed with said hub disc, said at least one mass-produced friction lining for being engaged between pressure plate means of a friction clutch and a rotating member of an engine; said mass-produced hub disc comprising support means for supporting said at least one mass-produced friction lining concentrically about said mass-produced hub disc and concentrically to the axis of rotation; and said at least one mass-produced friction lining comprising a ring shaped friction lining having an inner diameter disposed about said mass-produced hub and an outer diameter disposed about said inner diameter; and a ratio of said outer diameter to said inner diameter being substantially less than 1.5 to 1, whereby distortion of said at least one mass-produced friction lining is substantially less than in a friction clutch having a friction lining with a ratio of the outside diameter to the inside diameter of about 1.5 to 1, during use of said at least one mass produced friction lining in said mass-produced friction clutch.

Another concept of the invention resides broadly in the mass-produced clutch disc further including said ratio of said outer diameter to said inner diameter being in a range of between about 1.25:1 and 1.4:1.

Another concept of the invention reside broadly in a method of using a friction clutch in a motor vehicle, and, during use of the friction clutch, increasing transmission capability of the friction clutch for transmitting rotary power of an engine to a drive train of a motor vehicle during periods of increased frictional heating of the friction clutch, the friction clutch comprising: a housing; a clutch disc disposed within the housing and defining an axis of rotation and an axial direction parallel to the axis of rotation; pressure plate means for axially moving the clutch disc within the housing to engage the clutch disc with a rotating member of an engine of a motor vehicle; and means for moving said pressure plate means away from the clutch disc to relieve engagement between the clutch disc and a rotating member of an engine of a motor vehicle; the clutch disc comprising: hub means, said hub means having a hub for engaging shaft means of a transmission and a hub disc disposed about the hub; and at least one friction lining disposed with said hub disc for being engaged between the pressure plate means and a rotating member of an engine of a motor vehicle; the at least one friction lining having a surface area, an inner diameter and an outer diameter; said method comprising the steps of: providing at least one friction lining, each of the at least one friction lining comprising a diameter ratio of outer diameter to inner diameter of substantially less than 1.5 to 1; assembling the at least one friction lining with a hub disc; assembling the hub disc with a hub to form a clutch disc; assembling at least one pressure plate means, at least one clutch disc, and at least one means for moving said pressure plate means within a housing to form a friction clutch; assembling the friction clutch with a transmission to form at least a portion of a drive train; assembling the at least a portion of a drive train into a motor vehicle; and said method further comprising the steps of operating the motor vehicle, said steps of operating the motor vehicle comprising:

a) disengaging the at least one friction lining from a rotating member of the engine of the motor vehicle to disengage the transmission from the rotating member of the engine and at least reduce movement of the motor vehicle;

b) re-engaging the at least one friction lining with the rotating member of the engine of the motor vehicle to re-engage the transmission with the rotating member of the engine to increase movement of the motor vehicle;

c) repeating said disengaging and re-engaging to respectively at least reduce movement, and increase movement of the motor vehicle;

d) slipping the rotating member of the engine against the at least one friction lining prior to engagement of the at least one friction lining with the rotating member;

e) generating heat during said slipping and heating the at least one friction lining, whereby the at least one friction lining is warped upon heating of the at least one friction lining to a first degree;

whereby the at least one friction lining having the diameter ratio of substantially less than 1.5:1 is warped to a first amount at the first degree of heating generated by steps a, b, c, d and e, the first amount of warping being less than a second amount of warping of a friction lining having a diameter ratio of 1.5:1, at the first degree of heating generated by steps a, b, c, d and e; whereby a proportion of the surface area of the at least one friction lining having the diameter ratio of substantially less than 1.5:1 is maintained as available for engaging with the rotating member of the engine, the available proportion of the surface area of the at least one friction lining having the diameter ratio of substantially less than 1.5:1 being greater than an available proportion of a surface area of a friction lining having a diameter ratio of 1.5:1; and whereby the available proportion of the surface area of the at least one friction lining having the diameter ratio of substantially less than 1.5:1 provides a greater transmission capability than a transmission capability provided by an available proportion of the surface area of a friction lining having a diameter ratio of 1.5:1.

Another concept of the invention broadly resides in the method further including forming each of the plurality of friction linings to comprise a diameter ratio of outer diameter to inner diameter being in a range of between about 1.25:1 to about 1.4:1, whereby warping of said at least one friction lining is substantially minimized.

Another concept of the invention broadly resides in the mass-produced friction clutch wherein: said at least one friction lining comprises first and second friction linings, both of said first and second friction linings comprising said diameter ratio of between about 1.25:1 to about 1.4:1; said clutch disc further comprises means for supporting said first and second friction linings concentrically about said hub disc and spaced apart from one another in an axial direction; said clutch disc further comprises biasing member means disposed between said first and second friction linings for biasing said first and second friction linings in a direction away from one another; said biasing member means being configured for providing a remaining distance of travel between said first and second friction linings in a direction towards one another when said first and second friction linings are engaged between said pressure plate means and a rotating member of an engine; said friction clutch further comprises biasing means for biasing said pressure plate means in an axial direction towards the clutch disc to bias one of said first and second friction linings into engagement with a rotating member of an engine; said means for moving the pressure plate means away from the clutch disc comprises a further biasing member; said means for supporting said first and second friction linings comprises: first and second cover plates disposed on opposite sides of said hub disc, said first and second cover plates comprising means for non-rotationally connecting said first and second cover plates with respect to one another; and support member means disposed on one of said first and second cover plate means and extending radially from said one of said first and second cover plates; said support member means comprising said biasing member means for biasing said first and second friction linings away from one another; said support member means comprising a metal sheet, the metal sheet having rounded corrugations forming said biasing member means; said clutch disc further comprises torsional damping means disposed between said first and second cover plate means and said hub disc for damping rotational movement between said first and second friction linings and said hub in engagement with shaft means of a transmission; each of said hub disc and said first and second cover plate means comprise at least one window therethrough, said at least one window of each of said hub disc and said first and second cover plate means being axially aligned with the windows of the others of said hub disc and said first and second cover plate means; said torsional vibration damper comprises at least one spring member disposed in a circumferential direction within said aligned windows; said hub further comprises radially inwardly directed teeth for non-rotationally engaging with radially outwardly direct teeth of shaft means of a transmission; and said outside diameter of said first and second friction linings is between about 21 cm and about 24 cm and said inside diameter corresponds thereto to provide said ratio of about 1.3:1.

Another concept of the invention resides broadly in the friction lining wherein the ratio of the outside diameter to the inside diameter is substantially less than 1.5 to 1, whereby warpage of said friction lining is substantially less than in a friction clutch having a friction lining with an equivalent outside diameter and with a ratio of the outside diameter to the inside diameter being 1.5 to 1 and whereby more efficient heat distribution is provided throughout the clutch disc during periods of increased heat generation.

Another concept of the invention resides broadly in the friction lining wherein: said friction lining has a friction surface for contacting at least one opposite friction surface of said friction clutch; and the ratio of the outside diameter to the inside diameter is substantially less than 1.5 to 1, whereby warpage of said friction lining is substantially less than in a friction clutch having a friction lining with an equivalent outside diameter and with a ratio of the outside diameter to the inside diameter being 1.5 to 1 and whereby a greater proportion of the friction surface of said friction lining remains in contact with the at least one opposite friction surface of said friction clutch.

Another concept of the invention resides broadly in the mass-produced clutch disc wherein: said friction lining has a friction surface for contacting at least one opposite friction surface of said friction clutch; the ratio of the outside diameter to the inside diameter of said friction lining is substantially less than 1.5 to 1 and greater than 1.25 to 1; whereby warpage of said friction lining, after repeated starting of said motor vehicle on an uphill slope, is substantially less than in a friction clutch having a friction lining with a ratio of the outside diameter to the inside diameter of 1.5 to 1 and with the same outside diameter; whereby said clutch disc can withstand a greater amount of heating, before warpage occurs, than in a friction clutch having a friction lining with a ratio of the outside diameter to the inside diameter of 1.5 to 1 and with the same outside diameter; whereby warpage of said friction lining is substantially less than in a friction clutch having a friction lining with an equivalent outside diameter and with a ratio of the outside diameter to the inside diameter being 1.5 to 1 and whereby more efficient heat distribution is provided throughout the clutch disc during periods of increased heat generation; and whereby warpage of said friction lining is substantially less than in a friction clutch having a friction lining with an equivalent outside diameter and with a ratio of the outside diameter to the inside diameter being 1.5 to 1 and whereby a greater proportion of the friction surface of said friction lining remains in contact with the at least one opposite friction surface of said friction clutch.

Another concept of the invention resides broadly in the method wherein: said friction lining has a friction surface for contacting at least one opposite friction surface of said friction clutch; the ratio of the outside diameter to the inside diameter of said friction lining is substantially less than 1.5 to 1 and greater than 1.25 to 1; whereby warpage of said friction lining, after repeated starting of said motor vehicle on an uphill slope, is substantially less than in a friction clutch having a friction lining with a ratio of the outside diameter to the inside diameter of 1.5 to 1 and with the same outside diameter; whereby said clutch disc can withstand a greater amount of heating, before warpage occurs, than in a friction clutch having a friction lining with a ratio of the outside diameter to the inside diameter of 1.5 to 1 and with the same outside diameter; whereby warpage of said friction lining is substantially less than in a friction clutch having a friction lining with an equivalent outside diameter and with a ratio of the outside diameter to the inside diameter being 1.5 to 1 and whereby more efficient heat distribution is provided throughout the clutch disc during periods of increased heat generation; and whereby warpage of said friction lining is substantially less than in a friction clutch having a friction lining with an equivalent outside diameter and with a ratio of the outside diameter to the inside diameter being 1.5 to 1 and whereby a greater proportion of the friction surface of said friction lining remains in contact with the at least one opposite friction surface of said friction clutch.

Examples of clutches and components therefor which may be utilized in accordance with the present invention may be found in the following documents: U.S. patent application Ser. No. 08/221,372 filed on Mar. 31, 1994 entitled "FLYWHEEL & CLUTCH SYSTEM", having inventors Bernhard SCHIERLING and Hilmar GOBEL, issued as U.S. Pat. No. 5,476,166 on Dec. 19, 1995, which corresponds to Federal Republic of Germany patent application No. P 43 11 102, filed on Apr. 3, 1993, which corresponds to DE-OS 43 11 102 and DE-PS 43 11 102; U.S. patent application Ser. No. 08/360,455 filed on Dec. 21, 1994 entitled "FRICTION CLUTCH FOR A MOTOR VEHICLE", having inventor Harald JEPPE, which corresponds to Federal Republic of Germany patent application No. P 43 44 124, filed on Dec. 23, 1993, which corresponds to DE-OS 43 44 124 and DE-PS 43 44 124; U.S. patent application Ser. No. 08/405,139 filed on Mar. 16, 1995 entitled "A MOTOR VEHICLE MANUAL TRANSMISSION WITH A CLUTCH WHICH CLUTCH HAS A FASTENING STRUCTURE FOR FASTENING THE LINING SPRING SEGMENTS TO THE DRIVING PLATE", having inventors Jens SCHNEIDER and Harald JEPPE, which corresponds to Federal Republic of Germany patent application No. P 44 09 253, filed on Mar. 18, 1994, which COrresponds to DE-OS 44 09 253 and DE-PS 44 09 253; U.S. patent application Ser. No. 08/438,709 filed on May 11, 1995 entitled "CLUTCH ASSEMBLY FOR A MOTOR VEHICLE HAVING A FLEXIBLE CLUTCH DISC", having inventors Joachim LINDNER, Jorg SUDAU, and Bernhard SCHIERLING, which corresponds to Federal Republic of Germany patent application No. P 44 16 949, filed on May 13, 1994, which corresponds to DE-OS 44 16 949 and DE-PS 44 16 949; U.S. patent application Ser. No. 08/499, 305 filed on Jul. 7, 1995 entitled "CLUTCH DISC OF A MOTOR VEHICLE, WHICH CLUTCH DISC HAS AN ELASTIC CONNECTION BETWEEN THE CARRIER PLATE & HUB", having inventors Klaus MEMMEL, Gunter WAWRZIK, Winfried STURMER, and Harald JEPPE, which corresponds to Federal Republic of Germany patent application No. P 44 24 186, filed on Jul. 8, 1994, which corresponds to DE-OS 44 24 186 and DE-PS 44 24 186; U.S. patent application Ser. No. 08/502,401 filed on Jul. 14, 1995 entitled "A TRANSMISSION OF AN INTERNAL COMBUSTION ENGINE WITH A CLUTCH WITH A TWO-MASS FLYWHEEL", having inventors Michael WEISS, Jorg SUDAU, Bernhard SCHIERLING, Thomas WIRTH, Jurgen KLEIFGES, Reinhard FELDHAUS, Andreas ORLAMUNDER, and Eberhard KNAUPP, which corresponds to Federal Republic of Germany patent application No. P 195 19 363, filed on May 26, 1995, which corresponds to DE-OS 195 19 363 and DE-PS 195 19 363; U.S. patent application Ser. No. 08/504,848 filed on Jul. 20, 1995 entitled "AIR-COOLED FLYWHEEL & A FRICTION CLUTCH FOR A TRANSMISSION OF A MOTOR VEHICLE, THE FLYWHEEL HAVING TWO CENTRIFUGAL MASSES", having inventors Bernhard SCHIERLING, Rudolf BAUERLEIN, Cora CARLSON, and Hilmar GOBEL, which corresponds to Federal Republic of Germany patent application No. P 44 25 570, filed on Jul. 20, 1994, which corresponds to DE-OS 44 25 570 and DE-PS 44 25 570; U.S. patent application Ser. No. 08/515,263 filed on Aug. 15, 1995 entitled "A FLYWHEEL FOR THE FRICTION CLUTCH OF A MOTOR VEHICLE, THE FLYWHEEL HAVING TWO CENTRIFUGAL MASSES & A FRICTION DEVICE", having inventors Joachim LINDNER and Bernhard SCHIERLING, which corresponds to Federal Republic of Germany patent application No. P 44 28 832, filed on Aug. 17, 1994, which corresponds to DE-OS 44 28 832 and DE-PS 44 28 832; U.S. patent application Ser. No. 08/515,348 filed on Aug. 15, 1995 entitled "FRICTION CLUTCH FOR THE TRANSMISSION OF A MOTOR VEHICLE & A FLYWHEEL ASSEMBLY FOR A FRICTION CLUTCH", having inventors Joachim LINDNER and Bernhard SCHIERLING, which corresponds to Federal Republic of Germany patent application No. P 44 28 829, filed on Aug. 17, 1994, which corresponds to DE-OS 44 28 829 and DE-PS 44 28 829; and U.S. patent application Ser. No. 08/518,789 filed on Aug. 23, 1995 entitled "FRICTION CLUTCH ASSEMBLY FOR A MOTOR VEHICLE, THE FRICTION CLUTCH ASSEMBLY HAVING A CLUTCH PLATE WITH DIVIDED HUB DISC", having inventors Klaus MEMMEL, Jurgen KLEIFGES, Reinhard FELDHAUS, and Harald JEPPE, which corresponds to Federal Republic of Germany patent application No. P 44 29 870, filed on Aug. 23, 1994, which corresponds to DE-OS 44 29 870 and DE-PS 44 29 870. These patents and patent applications and their corresponding published patent applications, as well as their published equivalents, and other equivalents or corresponding applications, if any, and the references cited in any of the documents, publications, patents, and published patent applications cited herein, are hereby incorporated by reference as if set forth in their entirety herein. All of the above U.S. patent documents in this paragraph are assigned to Fichtel & Sachs AG of the Federal Republic of Germany.

Types of clutch assemblies in which the present invention may be utilized may be disclosed in the following U.S. Patents: U.S. Pat. No. 4,684,007 to Maucher on Aug. 4, 1987, entitled "Clutch Plate"; U.S. Pat. No. 4,635,780 to Wiggen on Jan. 13, 1987, entitled "Clutch Disc for a Motor Vehicle Friction Clutch"; and U.S. Pat. No. 4,651,857 to Schraut et al. on Mar. 24, 1987, entitled "Clutch Disc Unit for a Motor Vehicle Clutch".

Types of two-mass flywheels in which the present invention may be utilized may be disclosed in the following U.S. Patents: U.S. Pat. No. 5,103,688 to Kuhne on Apr. 14, 1992, entitled "Two-mass Flywheel"; U.S. Pat. No. 4,777,843 to Bopp on Oct. 18, 1988, entitled "Two-mass Flywheel Assembly with Viscous Damping Assembly"; U.S. Pat. No. 5,195,396 to Kamiya et al. on Mar. 23, 1993, entitled "Torque Variation Absorbing Device"; and U.S. Pat. No. 4,946,420 to Jackel on Aug. 7, 1990, entitled "Apparatus for Damping Torsional Vibrations".

Some examples of clutch discs and friction linings, which could have components interchangeable with the embodiments of the present invention may be disclosed by the following U.S. Patents: U.S. Pat. No. 5,000,304 to Koch, Raab, Dotter and Ament, entitled "Clutch Disc"; U.S. Pat. No. 4,941,558 to Schraut, entitled "Clutch Disc"; U.S. Pat. No. 4,854,438 to Weissenberger and Huditz, entitled "Clutch Disc for a Friction Disc Clutch"; U.S. Pat. No. 4,741,423 to Hayen, entitled "Clutch Disc for a Friction Clutch"; and U.S. Pat. No. 4,715,485 to Rostin, Tomm and Hartig, entitled "Clutch Disc for a Motor Vehicle Friction Clutch".

Some examples of transmissions in which the present invention may possibly be incorporated may be disclosed by the following U.S. Patents: U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if any, described herein.

All of the patents, patent applications and publications recited herein, and all of the publications recited in all of the publications recited herein are hereby incorporated by reference as if set forth in their entirety herein.

The corresponding foreign patent publication application namely, Federal Republec of Germany Patent Application No. P 43 34 374.0, filed on Oct. 8, 1993, and P 196 11 600.7 having inventor Hans Jurgen Drexl, and DE-OS 43 34 374.0 and DE-PS 43 34 374.0, and DE-OS 196 11 660 and as well as their published equivalents, DE-PS 196 11 600 are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a motor vehicle, said friction clutch comprising:

a housing;

a clutch disc disposed within said housing, said clutch disc defining an axis of rotation and an axial direction parallel to the axis of rotation;

a pressure plate disposed within said housing and being movable in the axial direction, said pressure plate for applying an axial force to said clutch disc along the axial direction;

an arrangement to bias said pressure plate in the axial direction to apply the axial force to said clutch disc;

said clutch disc comprising:

a hub, said hub comprising apparatus to engage a transmission shaft;

a hub disc disposed concentrically about said hub and extending radially away from said hub;

two friction linings disposed adjacent said hub disc;

apparatus to support said two friction linings concentrically about said hub and concentrically about the axis of rotation;

said two friction linings being attached to said support apparatus;

said two friction linings being disposed between said pressure plate and a rotating member of an engine;

said two friction linings comprising a first friction lining for contacting said pressure plate, and a second friction lining for contacting a rotating member of an engine upon engagement of said first friction lining and said second friction lining between said pressure plate and a rotating member of an engine;

said first friction lining having a surface area facing said pressure plate;

said pressure plate having a surface area facing said first friction lining;

said surface area of said first friction lining and said surface area of said pressure plate being in contact with one another upon the engagement of said clutch;

said pressure plate having an inside diameter and an outside diameter;

said inside and outside diameters being dimensioned in relation to one another to minimize deformation of said pressure plate, and to maximize the total percentage of said surface area of said pressure plate in contact with the total percentage of said surface area of said first friction lining upon engagement of said clutch upon application of peak thermal load; and said inside and outside diameters being dimensioned in relation to one another to minimize fading of the clutch upon application of peak thermal load and to maximize torque transmission upon application of peak thermal load.

2. The friction clutch according to claim 1, wherein:

said pressure plate has a width defined radially between said inside diameter and said outside diameter; and said radial width being substantially less than half of the radius of said inside diameter, to minimize warpage of said pressure plate to thus maximize the total percentage of said surface area of said pressure plate in contact with the total percentage of said surface area of said first friction lining upon engagement of said clutch, and to maximize torque transmission upon application of peak thermal load.

3. The friction clutch according to claim 2, wherein said radial width of said pressure plate is greater than a quarter of the radius of said inside diameter of said pressure plate, to minimize warpage of said pressure plate to thus maximize the total percentage of said surface area of said pressure plate in contact with the total percentage of said surface area of said first friction lining upon engagement of said clutch, and to maximize torque transmission upon application of peak thermal load.

4. The friction clutch according to claim 3, wherein said dimensional relationship of said outside and inside diameters of said pressure plate is a ratio of the outside diameter to the inside diameter of less than about 1.4 to 1.

5. The friction clutch according to claim 4 wherein said pressure plate has a ratio of the outside diameter to the inside diameter in a range of about 1.38 to 1 and 1.25 to 1.

6. The friction clutch according to claim 1 wherein:

said support apparatus comprises a friction lining carrier, said friction lining carrier comprising:

lining springs disposed between said first friction lining and said second friction lining to bias said first friction lining and said second friction lining in the axial direction away from one another;

said lining springs being configured to permit axial movement of said first friction lining toward said second friction lining upon complete engagement of the clutch, and thus upon the engagement of said first friction lining and said second friction lining between said pressure plate and a rotating member of an engine, to provide a residual lining spring travel;

said lining springs being configured to permit axial movement of said first friction lining toward said second friction lining after said pressure plate has exerted maximum force upon said first and second friction linings, to provide said residual lining spring travel;

said residual lining spring travel comprising a substantial portion of the travel of said lining springs from a disengaged position of said pressure plate to a fully collapsed position of said lining springs; and said residual lining spring travel being of a dimension sufficient to compensate for thermal deformation of said pressure plate.

7. A friction clutch for a motor vehicle, said friction clutch comprising:

a housing;

a clutch disc disposed within said housing, said clutch disc defining an axis of rotation and an axial direction parallel to the axis of rotation;

a pressure plate disposed within said housing and being movable in the axial direction, said pressure plate for applying an axial force to said clutch disc along the axial direction;

an arrangement to bias said pressure plate in the axial direction to apply the axial force to said clutch disc;

said clutch disc comprising:

a hub, said hub comprising means for engaging a transmission shaft;

a hub disc disposed concentrically about said hub and extending radially away from said hub;

friction lining structure disposed adjacent said hub disc;

means for supporting said friction lining structure concentrically about said hub and concentrically about the axis of rotation;

said friction lining structure being attached to said supporting means;

said friction lining structure being disposed between said pressure plate and a rotating member of an engine;

said friction lining structure comprising a first friction lining surface for contacting said pressure plate, and a second friction lining surface being configured to contact a rotating member of an engine upon engagement of said clutch;

said pressure plate having an inside diameter and an outside diameter; and said inside and outside diameters being dimensioned in relation to one another to minimize thermal deformation of said pressure plate upon application of heavy thermal load, and to minimize fading of the clutch and maximize torque transmission upon application of heavy thermal load.

8. The friction clutch according to claim 7, wherein said pressure plate has a ratio of said outside diameter to said inside diameter in a range of about 1.38 to 1 and about 1.25 to 1.

9. The friction clutch according to claim 8 wherein:

said friction lining structure comprises a first friction lining and a second friction lining;

said supporting means comprises a friction lining carrier, said friction lining carrier comprising:

lining springs disposed between said first friction lining and said second friction lining to bias said first friction lining and said second friction lining in the axial direction away from one another;

said lining springs being configured to permit axial movement of said first friction lining toward said second friction lining upon complete engagement of the clutch, and thus upon the engagement of said first friction lining and said second friction lining between said pressure plate and a rotating member of an engine, to provide a residual lining spring travel;

said lining springs being configured to permit axial movement of said first friction lining toward said second friction lining after said pressure plate has exerted maximum force upon said first and second friction linings, to provide said residual spring travel;

said residual lining spring travel comprising a substantial portion of the travel of said lining springs from a disengaged position of said pressure plate to a fully collapsed position of said lining springs; and said residual lining spring travel is of a dimension sufficient to compensate for thermal deformation of said pressure plate.

10. The friction clutch according to claim 9 wherein:

said residual lining spring travel is between about 0.10 mm to 0.30 mm; and said pressure plate is configured to have a ratio of said outside diameter to said inside diameter of about 1.30 to 1 to minimize warpage of said pressure plate, to enable said pressure plate to withstand a greater amount of heating before warpage occurs, and to maximize the total percentage of the surface area of said pressure plate in contact with the total percentage of said first friction lining surface upon engagement of said clutch upon application of heavy thermal load, as compared to a friction clutch having a pressure plate with a ratio of the outside diameter to the inside diameter of 1.5 to 1 and with the same outside diameter as said pressure plate.

11. A friction clutch for a motor vehicle, said friction clutch comprising:

a housing;

a clutch disc disposed within said housing, said clutch disc defining an axis of rotation and an axial direction parallel to the axis of rotation;

a pressure plate disposed within said housing and being movable in the axial direction, said pressure plate for applying an axial force to said clutch disc along the axial direction;

said clutch disc comprising a friction lining structure disposed adjacent said pressure plate;

said friction lining structure being configured to be disposed adjacent a rotating member of an engine;

said friction lining structure being configured to contact said pressure plate and a rotating member of an engine upon engagement of said clutch;

said friction lining structure comprising a friction lining surface facing said pressure plate;

said pressure plate having a surface area facing said friction lining surface;

said pressure plate comprising an inside diameter and an outside diameter;

said inside and outside diameters being dimensioned in relation to one another to minimize deformation of said pressure plate, and to maximize the total percentage of said surface area of said pressure plate in contact with the total percentage of said friction lining surface upon engagement of said clutch upon application of heavy thermal load; and said inside and outside diameters being dimensioned in relation to one another to minimize fading upon application of heavy thermal load and to maximize torque transmission of said clutch upon application of heavy thermal load.

12. The friction clutch according to claim 11 wherein:

said pressure plate has a width defined radially between said inside diameter and said outside diameter; and said radial width being substantially less than half of the radius of said inside diameter, and greater than about a quarter of the radius of said inside diameter, to minimize warpage of said pressure plate and to thus maximize the total percentage of said surface area of said pressure plate in contact with the total percentage of said friction lining surface upon engagement of said clutch, to thereby maximize torque transmission upon application of heavy thermal load.

13. The friction clutch according to claim 12, wherein:

said dimensional relationship of said outside and inside diameters of said pressure plate is a ratio of said outside diameter to said inside diameter of less than about 1.4 to 1;

said clutch disc comprises:
two friction linings;
apparatus to support said two friction linings concentrically about the axis of rotation;
said two friction linings being attached to said support apparatus;
said two friction linings being disposed between said pressure plate and a rotating member of an engine;
said two friction linings comprising a first friction lining for contacting said pressure plate, and a second friction lining for contacting a rotating member of an engine upon engagement of said clutch;
said support apparatus comprises a friction lining carrier, said friction lining carrier comprising:
lining springs disposed between said first friction lining and said second friction lining to bias said first friction lining and said second friction lining in the axial direction away from one another;
said lining springs being configured to permit axial movement of said first friction lining toward said second friction lining upon complete engagement of the clutch, and thus upon the engagement of said first friction lining and said second friction lining between said pressure plate and a rotating member of an engine, to provide a residual lining spring travel;
said lining springs being configured to permit axial movement of said first friction lining toward said second friction lining after said pressure plate has exerted maximum force upon said first and second friction linings, to provide said residual lining spring travel; and
said residual lining spring travel comprising a substantial portion of the travel of said lining springs from a disengaged position of said pressure plate to a fully collapsed position of said lining springs.

14. The friction clutch according to claim 13, wherein said pressure plate has a ratio of said outside diameter to said inside diameter in a range of about 1.38 to 1 and 1.25 to 1.

15. The friction clutch according to claim 14, wherein:

said pressure plate comprises a thin pressure plate;

said thin pressure plate has a ratio of the outside diameter to the inside diameter of about 1.30 to 1; and said residual lining spring travel being of a dimension sufficient to compensate for thermal deformation of said thin pressure plate.

16. The friction clutch according to claim 15 wherein said residual lining spring travel distance is between about 0.10 mm to 0.30 mm.

17. The friction clutch according to claim 16 wherein:

said thin pressure plate being configured to have said ratio of about 1.30 to 1 to minimize warpage of said thin pressure plate and enable said thin pressure plate to withstand a greater amount of heating before warpage occurs, as compared to a friction clutch having a pressure plate with a ratio of outside diameter to inside diameter of 1.5 to 1 and with the same outside diameter as said thin pressure plate.

18. A friction clutch for a motor vehicle, said friction clutch comprising:

a housing;

a pressure plate disposed in said housing;

a clutch disc disposed adjacent to said pressure plate;

said pressure plate being disposed to apply a force to said clutch disc;

said pressure plate comprising an inside diameter and an outside diameter; and said inside and outside diameters being dimensioned in relation to one another to minimize thermal deformation of said pressure plate upon application of heavy thermal load, and to minimize fading of the clutch and maximize torque transmission of said clutch upon application of heavy thermal load.

19. The friction clutch according to claim 18, wherein said pressure plate has a ratio of said outside diameter to said inside diameter of less than about 1.4 to 1.

20. The friction clutch according to claim 19, wherein said pressure plate has a ratio of said outside diameter to said inside diameter in a range of about 1.38 to 1 and about 1.25 to 1 to minimize thermal deformation of said pressure plate.

21. The friction clutch according to claim 20 wherein said clutch disc comprises:
- a first friction lining and a second friction lining;
- a friction lining carrier, said friction lining carrier comprising:
  - lining springs disposed between said first friction lining and said second friction lining to bias said first friction lining and said second friction lining in the axial direction away from one another;
  - said lining springs being configured to permit axial movement of said first friction lining toward said second friction lining upon complete engagement of the clutch, and thus upon the engagement of said first friction lining and said second friction lining between said pressure plate and a rotating member of an engine, to provide a residual lining spring travel;
  - said lining springs being configured to permit axial movement of said first friction lining toward said second friction lining after said pressure plate has exerted maximum force upon said friction linings, to provide said residual lining spring travel;
  - said residual lining spring travel comprising a substantial portion of the travel of said lining springs from a disengaged position of said pressure plate to a fully collapsed position of said lining springs; and
  - said residual lining spring travel is of a dimension sufficient to compensate for thermal deformation of said pressure plate.

22. The friction clutch according to claim 21 wherein:
- said residual lining spring travel is between about 0.10 mm to 0.30 mm;
- said pressure plate comprises a thin pressure plate; and
- said thin pressure plate has a ratio of the outside diameter to the inside diameter of about 1.30 to 1;
- said first friction lining having a surface area facing said thin pressure plate;
- said thin pressure plate having a surface area facing said first friction lining;
- said surface area of said first friction lining and said surface area of said thin pressure plate being in contact with one another upon the engagement of said clutch; and
- said thin pressure plate is configured to have said ratio of about 1.30 to 1 to minimize warpage of said thin pressure plate, to enable said thin pressure plate to withstand a greater amount of heating before pressure plate warpage occurs, and to maximize the total percentage of said surface area of said pressure plate in contact with the total percentage of said surface area of said first friction lining upon engagement of said clutch upon application of peak thermal load, as compared to a friction clutch having a pressure plate with a ratio of outside diameter to inside diameter of 1.5 to 1 and with the same outside diameter as said thin pressure plate.

23. The friction clutch according to claim 18 wherein:
said clutch disc comprises:
- two friction linings;
- said two friction linings comprising a first friction lining and a second friction lining;
- a friction lining carrier;
- said friction lining carrier comprises:
  - lining springs disposed between said first friction lining and said second friction lining to bias said first friction lining and said second friction lining in the axial direction away from one another;
  - said lining springs being configured to permit axial movement of said first friction lining toward said second friction lining upon complete engagement of the clutch, and thus upon the engagement of said first friction lining and said second friction lining between said pressure plate and a rotating member of an engine, to provide a residual lining spring travel;
  - said lining springs being configured to permit axial movement of said first friction lining toward said second friction lining after said pressure plate has exerted maximum force upon said first and second friction linings, to provide said residual lining spring travel;
  - said residual lining spring travel comprising a substantial portion of the travel of said lining springs from a disengaged position of said pressure plate to a fully collapsed position of said lining springs; and
  - said residual lining spring travel being of a dimension sufficient to compensate for thermal deformation of said pressure plate.

* * * * *